(12) United States Patent
Yui et al.

(10) Patent No.: US 9,970,613 B2
(45) Date of Patent: May 15, 2018

(54) LIGHTING MEMBER, LIGHTING DEVICE, AND METHOD FOR INSTALLING LIGHTING MEMBER

(71) Applicant: SHARP KABUSHIKI KAISHA, Sakai, Osaka (JP)

(72) Inventors: Hideomi Yui, Sakai (JP); Tsuyoshi Kamada, Sakai (JP); Tomoko Nango, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days. days.

(21) Appl. No.: 15/115,998

(22) PCT Filed: Feb. 2, 2015

(86) PCT No.: PCT/JP2015/052820
§ 371 (c)(1),
(2) Date: Aug. 2, 2016

(87) PCT Pub. No.: WO2015/119071
PCT Pub. Date: Aug. 13, 2015

(65) Prior Publication Data
US 2017/0167679 A1    Jun. 15, 2017

(30) Foreign Application Priority Data
Feb. 4, 2014   (JP) .................. 2014-019605

(51) Int. Cl.
*F21S 11/00* (2006.01)
*F21V 5/02* (2006.01)
(Continued)

(52) U.S. Cl.
CPC .............. *F21S 11/007* (2013.01); *E06B 9/28* (2013.01); *E06B 9/386* (2013.01); *F21V 5/02* (2013.01);
(Continued)

(58) Field of Classification Search
CPC .................. F21S 11/007; E06B 9/28
(Continued)

(56) References Cited

U.S. PATENT DOCUMENTS 5,650,875 A * 7/1997 Kanada .................... E06B 9/24
                                                                359/591
5,731,900 A * 3/1998 Milner .................... B60R 1/10
                                                                359/627
(Continued)

FOREIGN PATENT DOCUMENTS

JP    2001-090277    4/2001
JP    2002-535690    10/2002
(Continued)

OTHER PUBLICATIONS

International Search Report for PCT/JP2015/052820 dated Apr. 28, 2015, 2 pages.
(Continued)

*Primary Examiner* — Christopher Mahoney
(74) *Attorney, Agent, or Firm* — ScienBiziP, P.C.

(57) ABSTRACT

There is provided a lighting film according to one aspect of the invention including: a first substrate having optical transparency; a plurality of lighting units formed of a plurality of polygonal prism-shaped structures having optical transparency provided on a first surface of the first substrate; and gaps provided between the plurality of lighting units, in which the lighting unit is a polygon which has five vertexes in a sectional shape orthogonal to a longitudinal direction and has all of internal angles smaller than 180°, the lighting unit includes a first side which is one side of the polygon corresponding to a surface contacted with the first substrate, and a plurality of vertexes including a first vertex and a second vertex which are vertexes corresponding to both ends of the first side and a third vertex which is not positioned on the first side, a length of a perpendicular line of the first side passing the third vertex is longer than a length of a perpendicular line of the first side passing a (Continued)

vertex other than the third vertex among the plurality of vertexes, and a shape of the lighting unit is asymmetrical with a perpendicular line of the first side passing the third vertex as the center.

11 Claims, 26 Drawing Sheets

(51) Int. Cl.
    *G02B 5/04*         (2006.01)
    *E06B 9/28*         (2006.01)
    *E06B 9/386*       (2006.01)
    *E06B 9/24*         (2006.01)

(52) U.S. Cl.
    CPC ...... *G02B 5/045* (2013.01); *E06B 2009/2417* (2013.01)

(58) Field of Classification Search
    USPC ........................................................ 359/592
    See application file for complete search history.

(56) References Cited

U.S. PATENT DOCUMENTS

| | | |
|---|---|---|
| 6,456,437 B1 | 9/2002 | Lea et al. |
| 2005/0094295 A1 | 5/2005 | Yamashita et al. |
| 2007/0053206 A1 | 3/2007 | Yamashita et al. |
| 2011/0043919 A1 | 2/2011 | Ko et al. |
| 2013/0038928 A1 | 2/2013 | Padiyath et al. |
| 2014/0098912 A1 | 4/2014 | Yin et al. |
| 2015/0049387 A1* | 2/2015 | Kashiwagi ............ B29C 43/021 359/592 |
| 2017/0114590 A1* | 4/2017 | Shinozaki ................. E06B 9/24 |
| 2017/0146207 A1* | 5/2017 | Nishinaka ............... F21S 11/007 |

FOREIGN PATENT DOCUMENTS

| | | | | |
|---|---|---|---|---|
| JP | 2004-046076 | 2/2004 | | |
| JP | 2005-049857 | 2/2005 | | |
| JP | 2011-123478 | 6/2011 | | |
| JP | 5123364 | 1/2013 | | |
| JP | 2013-514549 | 4/2013 | | |
| WO | WO 97/31276 | 8/1997 | | |
| WO | WO 2014200113 A1 * | 12/2014 | ............... | E03B 9/28 |

OTHER PUBLICATIONS

Written Opinion of the ISA (Japanese language) for PCT/JP2015/052820 dated Apr. 28, 2015, 5 pages.

\* cited by examiner

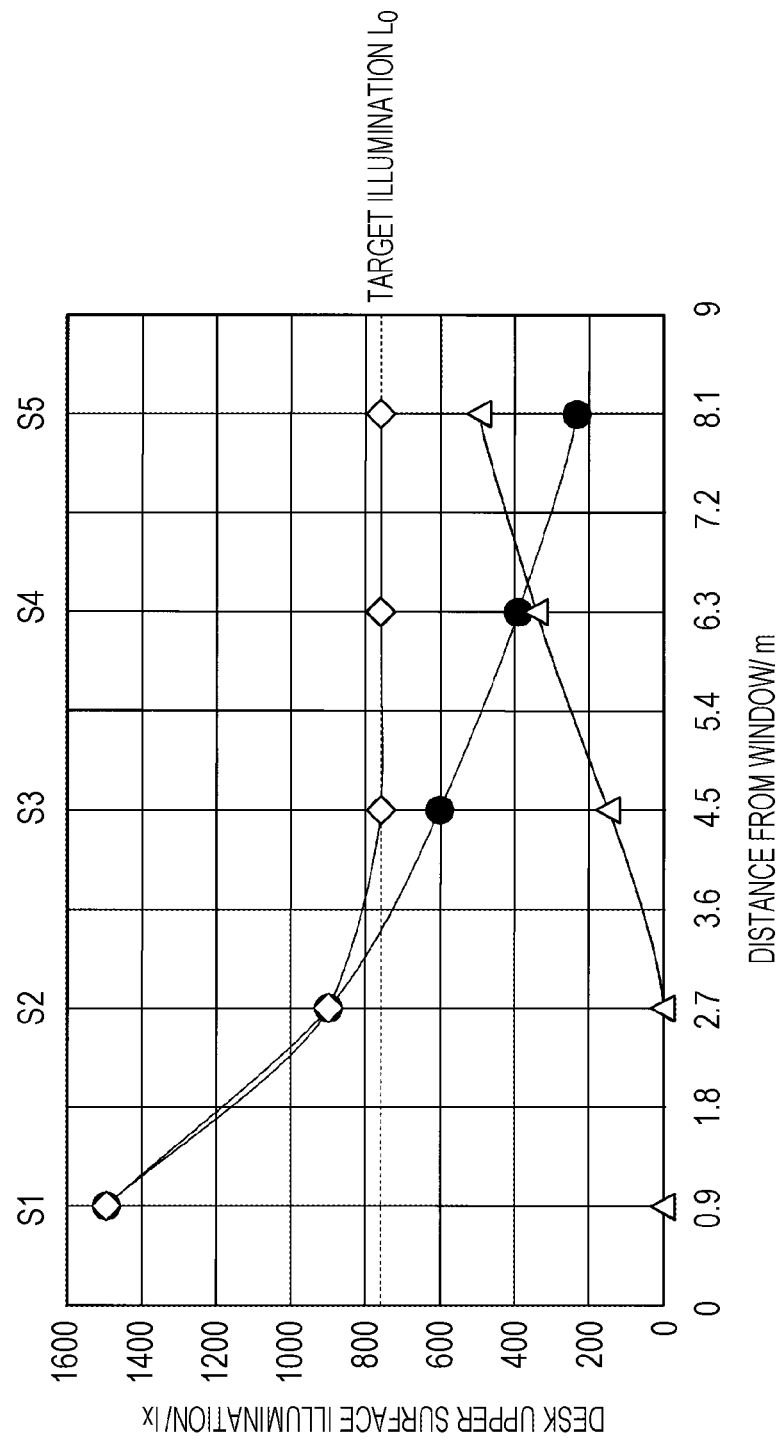

LIGHTING MEMBER, LIGHTING DEVICE, AND METHOD FOR INSTALLING LIGHTING MEMBER

TECHNICAL FIELD

The present invention relates to a lighting member, a lighting device, and a method for installing a lighting member.

This application is the U.S. national phase of International Application No. PCT/JP2015/052820 filed on Feb. 2, 2015 which designated the U.S. and claims priority to Japanese Patent Application No. 2014-019605 filed in Japan on Feb. 4, 2014, the entire contents of each of which are hereby incorporated by reference.

BACKGROUND ART

PTLs 1 and 2 propose lighting members allowing sunlight to enter a room through a window or the like of a building. In such lighting members, a plurality of unit prisms and a flat surface are formed on one surface of a transparent support. Sunlight is allowed to enter a room through the unit prisms.

CITATION LIST

Patent Literature

PTL 1: Japanese Patent No. 5123364
PTL 2: Japanese Unexamined Patent Application Publication (Translation of PCT Application) No. 2013-514549

SUMMARY OF INVENTION

Technical Problem

However, in the configuration of PTLs 1 and 2, the unit prism has a shape having a curved surface. In a case where the unit prism has a shape having a curved surface, light incident to the unit prism may be output in various directions depending on incident positions. That is, light transmitted through a lighting film may approach a position of the eyes of a person in a room. Such light may cause glare and a person in a room may feel uncomfortable.

In lighting films in the related art, it is difficult to light the innermost part of a room due to light being directed towards the ceiling in the room. That is, it is difficult to illuminate the room over a wide range, due to light reflected by the ceiling. In the lighting films in the related art, light is intensively directed to an area of the ceiling close to the window glass and a large difference may occur in illumination distribution of the ceiling. Accordingly, a person may be dazzled in the front area of the room and may feel that the room is darker in the inner area of the room. In this case, not only at night, but also during the day time, a bright environment is maintained by using lighting equipment, and natural light (sunlight) may not be sufficiently used.

The present invention has been made to address the aforementioned problems and an object of the invention is to provide a lighting member, a lighting device, and a method for installing a lighting member, capable of ensuring a bright environment in a room by sufficiently using natural light (sunlight) and further preventing glare light.

Solution to Problem

According to one aspect of the invention, there is provided a lighting member including: a first substrate having optical transparency; a plurality of lighting units formed of a plurality of polygonal prism-shaped structures having optical transparency provided on a first surface of the first substrate; and gaps provided between the plurality of lighting units, in which the polygonal prism-shaped structure is a polygon which has four or more vertexes in a sectional shape orthogonal to a longitudinal direction of the polygonal prism-shaped structure and has all of internal angles smaller than 180°, the polygon includes a first side which is one side of the polygon of the polygonal prism-shaped structure corresponding to a surface contacted with the first substrate, and a plurality of vertexes including a first vertex and a second vertex which are vertexes corresponding to both ends of the first side and a third vertex which is not positioned on the first side, a length of a perpendicular line of the first side passing the third vertex is longer than a length of a perpendicular line of the first side passing a vertex other than the third vertex among the plurality of vertexes, and a shape of the polygon is asymmetrical with a perpendicular line of the first side passing the third vertex as the center.

In the lighting member according to one aspect of the invention, when the polygon is a pentagon, a vertex positioned on one side of the perpendicular line of the first side passing the third vertex is set as a fourth vertex, and a vertex positioned on the other side is set as a fifth vertex, a length of a perpendicular line of the first side passing the fourth vertex may be longer than a length of a perpendicular line of the first side passing the fifth vertex.

In the lighting member according to one aspect of the invention, when a side connecting the third side and the fourth side is set as a second side and a side connecting the third side and the fifth side is set as a third side, an angle formed by the perpendicular line of the first side passing the third vertex and the second side may be greater than an angle formed by the perpendicular line of the first side passing the third vertex and the third side.

In the lighting member according to one aspect of the invention, the length of the perpendicular line of the first side passing the fifth vertex may be longer than ½ of the length of the perpendicular line of the first side passing the third vertex.

In the lighting member according to one aspect of the invention, when the polygon is a hexagon, a vertex positioned on one side of the perpendicular line of the first side passing the third vertex is set as a fourth vertex, a vertex far from the first side among two vertexes positioned on the other side is set as a fifth vertex, and a vertex close to the first side is set as a sixth vertex, a length of a perpendicular line of the first side passing the fourth vertex may be longer than a length of a perpendicular line of the first side passing the fifth vertex.

In the lighting member according to one aspect of the invention, when a side connecting the third side and the fourth side is set as a second side and a side connecting the third side and the fifth side is set as a third side, an angle formed by the perpendicular line of the first side passing the third vertex and the second side may be greater than an angle formed by the perpendicular line of the first side passing the third vertex and the third side.

In the lighting member according to one aspect of the invention, the length of the perpendicular line of the first side passing the fifth vertex may be longer than ½ of the length of the perpendicular line of the first side passing the third vertex.

In the lighting member according to one aspect of the invention, the lighting member may further include an auxiliary lighting unit formed of a polygonal prism-shaped structure having optical transparency between the two adjacent lighting units, the auxiliary lighting unit may have a triangular shape in a sectional shape orthogonal to a longitudinal direction of the auxiliary lighting unit, and the triangle may have a side tilted to a side opposite to the tilt of the side positioned on a side where the area with respect to the perpendicular line of the first side passing the third vertex in the polygon is large.

In the lighting member according to one aspect of the invention, there is provided a lighting device of the invention including: the lighting member; and a support member which supports the lighting member, in which the lighting device introduces external light through the lighting member.

In the lighting member according to one aspect of the invention, the lighting device may further include an accommodation mechanism which folds and accommodates the support member supporting the lighting member so as to be input and output.

In the lighting member according to one aspect of the invention, the lighting device may further include a winding mechanism of winding the support member supporting the lighting member so as to be input and output.

According to one aspect of the invention, there is provided a method for installing a lighting member, including: arranging lighting units so that a side of a polygon where an area with respect to a perpendicular line of a first side passing a third vertex is large faces a lower side in a vertical direction; and installing the lighting member in a transparent structure, in which the lighting member includes, a first substrate having optical transparency; a plurality of lighting units formed of a plurality of polygonal prism-shaped structures having optical transparency provided on a first surface of the first substrate; and gaps provided between the plurality of lighting units, in which the polygonal prism-shaped structure is a polygon which has four or more vertexes in a sectional shape orthogonal to a longitudinal direction of the polygonal prism-shaped structure and has all of internal angles smaller than 180°, the polygon includes a first side which is one side of the polygon of the polygonal prism-shaped structure corresponding to a surface contacted with the first substrate, and a plurality of vertexes including a first vertex and a second vertex which are vertexes corresponding to both ends of the first side and a third vertex which is not positioned on the first side, a length of a perpendicular line of the first side passing the third vertex is longer than a length of a perpendicular line of the first side passing a vertex other than the third vertex among the plurality of vertexes, and a shape of the polygon is asymmetrical with a perpendicular line of the first side passing the third vertex as the center.

Advantageous Effects of Invention

As described above, according to the one aspect of the invention, it is possible to provide a lighting member capable of efficiently allowing outdoor natural light (sunlight) to enter a room and cause a person in the room feel that the inner area of the room is bright, without being dazzled, a lighting device using such a lighting member, and a method for installing the lighting member.

BRIEF DESCRIPTION OF DRAWINGS

FIG. 31 is a graph showing a relationship between illumination of light (natural light) taken into a room by the lighting device and illumination (illumination modulating system) obtained by an interior lighting device.

DESCRIPTION OF EMBODIMENTS

Hereinafter, embodiments of the invention will be described with reference to the drawings. In each drawing used in the following description, each member is set to have a recognizable size, and therefore, the scale of each member is suitably changed.

[First Embodiment]

A lighting film of a first embodiment is an example of a lighting member which takes sunlight into a room in a state of being attached to a window, for example.

Figure 1:
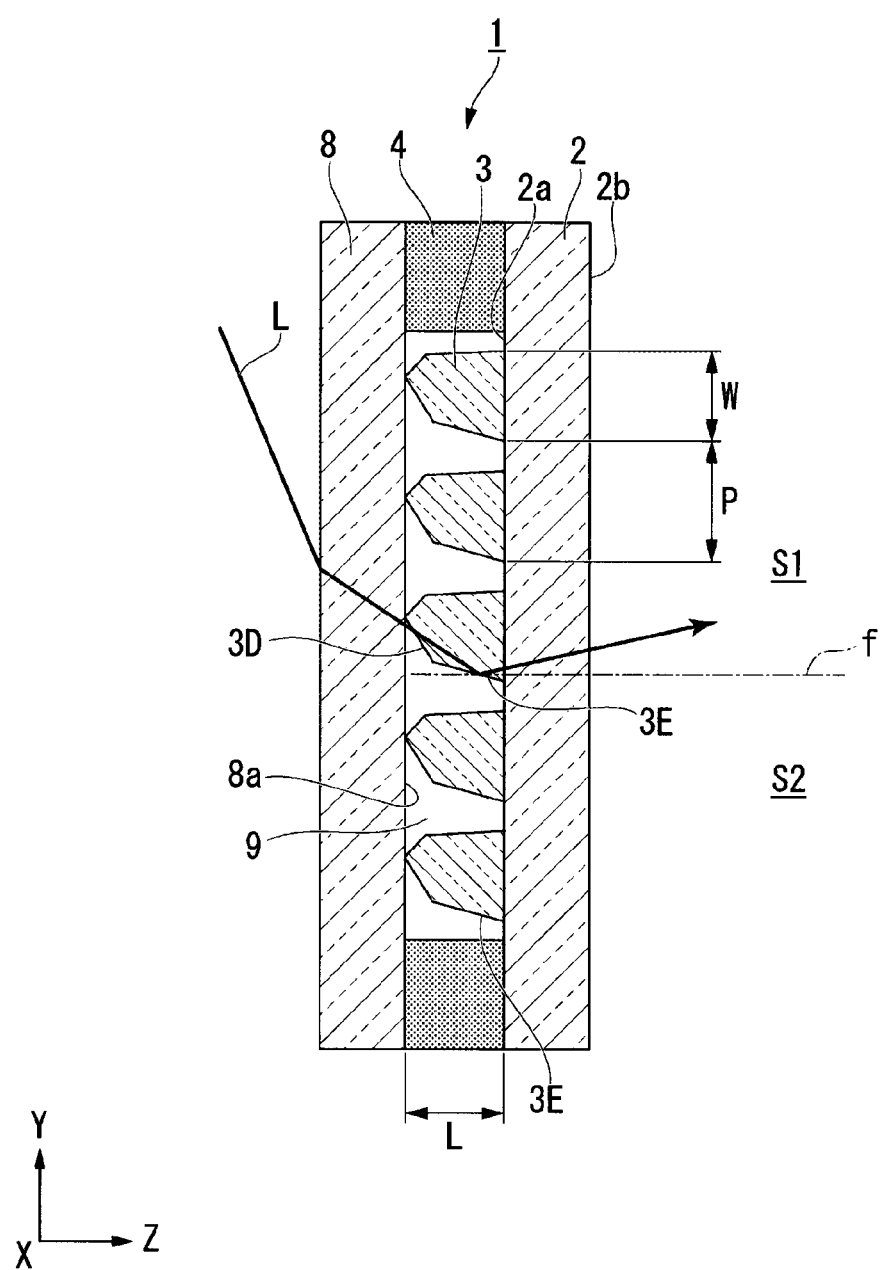
FIG. 1 is a sectional view showing an overall configuration of a lighting member of a first embodiment.

FIG. 1 is a sectional view showing an overall configuration of a lighting member of the first embodiment of the invention.

Figure 2:
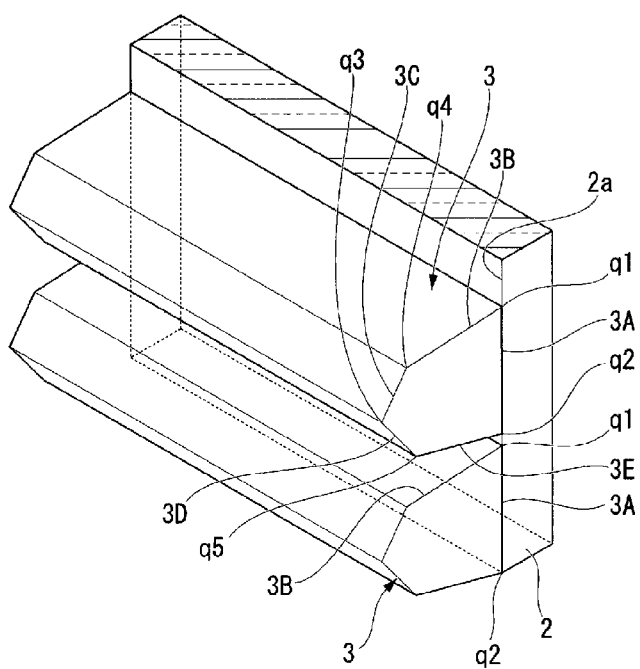
FIG. 2 is a perspective view showing a configuration of a plurality of lighting units of the lighting member of the first embodiment.

FIG. 2 is a perspective view showing a configuration of a plurality of lighting units of the lighting member of the first embodiment.

Figure 3:
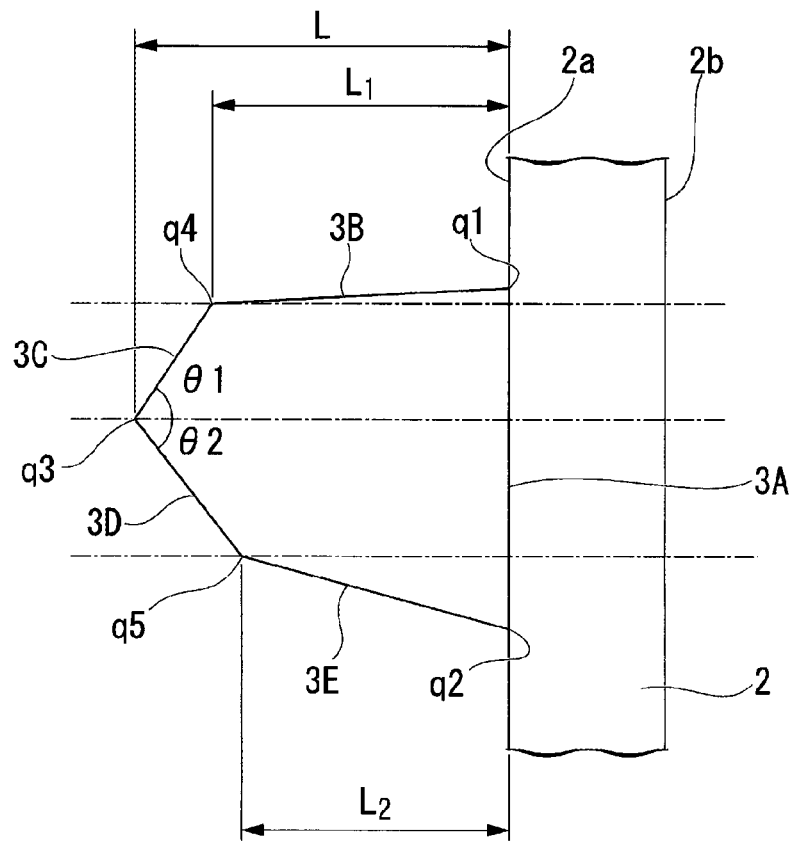
FIG. 3 is a sectional view when the light unit of the first embodiment is cut in a direction orthogonal to a longitudinal direction.

FIG. 3 is a sectional view when the light unit is cut in a direction orthogonal to a longitudinal direction.

As shown in FIG. 1, includes a lighting film (lighting member) 1 of this embodiment, a first substrate 2, a plurality of lighting units (polygonal prism-shaped structures) 3, and a first adhesive layer 4. The plurality of lighting units 3 are provided on a first surface 2a of the first substrate 2. The first adhesive layer 4 is provided on a periphery portion of the first surface 2a of the first substrate 2 and cause the entire lighting film 1 to adhere to a window glass (transparent structure) 8. Gaps 9 are provided between the plurality of lighting units 3.

Here, a vertical direction of the space and a vertical direction (XY direction) of the lighting film 1 adhered to the window glass 8 coincide with each other.

In this embodiment, the lighting film 1 is adhered to a surface of the window glass 8 on the indoor side.

As the first substrate 2, an optical transparent substrate formed of a thermoplastic polymer or resins such as a thermosetting resin or a photopolymerizable resin is used, for example. Optical transparent substrates formed of an acrylic polymer, an olefin polymer, a vinyl polymer, a cellulose polymer, an amide polymer, a fluorine polymer, a urethane polymer, a silicone polymer, or an imide polymer are used. Specifically, optical transparent substrate such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) the film is preferably used, for example.

In this embodiment, a PET film having a thickness of 100 μm is used, for example. A total light transmittance of the first substrate 2 is preferably equal to or greater than 90% substrated on HS K7361-1. Accordingly, it is possible to obtain sufficient transparency.

The thickness of the first substrate 2 is arbitrarily set and the shape thereof is not limited to a film shape and may be a plate shape. The first substrate may also have a laminated structure in which a plurality of substrates are laminated each other.

The lighting unit 3 is configured with an organic material having optical transparency and slow acting properties such as an acrylic resin, an epoxy resin, or a silicone resin, for example. A transparent resin mixture obtained by mixing a polymerization initiator, a coupling agent, a monomer, or an organic solvent with the resins described above can be used. In addition, the polymerization initiator may contain various additive components such as a stabilizer, an inhibitor, a plasticizer, an optical brightener, a mold release agent, a chain transfer agent, or other photopolymerizable monomer.

In this embodiment, the plurality of lighting units 3 are formed on the first substrate 2 by using a heat imprinting method. The method for forming the lighting units 3 is not limited to the heat imprinting method, and a UV imprinting method, a heat pressing method, an injection molding method, an extrusion molding method, or a compressive molding method may be used, for example. The first substrate 2 and the lighting units 3 are integrally formed with the same resin by using a method such as a melt extruding method or a mold extruding method.

In this embodiment, polymethylmethacrylate (PMMA) is used as an example of the lighting units 3. A total light transmittance of the lighting units 3 is preferably equal to or greater than 90% substrated on JIS K7361-1. Accordingly, it is possible to obtain sufficient transparency.

As shown in FIG. 2, the lighting unit 3 extends in a linear elongated shape in one direction (direction orthogonal to the space of FIG. 1) and a sectional shape orthogonal to a longitudinal direction is a polygon. Specifically, the lighting unit 3 is a polygon which has five vertexes in a sectional shape and has all of the internal angles smaller than 180°. The plurality of lighting units 3 are parallel to one side of the first substrate 2 having a rectangular shape in the longitudinal direction and are disposed at intervals from each other in a width direction. The adjacent lighting units 3 (a first vertex q1 of one lighting unit 3 and a second vertex q2 of another lighting unit 3 which are adjacent each other) may be contacted with each other.

As shown in FIG. 3, a sectional shape of each lighting unit 3 includes a first side 3A, a second side 3B, a third side (second side) 3C, a fourth side (third side) 3D, a fifth side 3E, a first vertex q1, a second vertex q2, a third vertex q3, a fourth vertex q4, and a fifth vertex q5. The first vertex q1 and the second vertex q2 are vertexes corresponding to both ends of the first side 3A, a vertex positioned on the upper side is the first vertex q1, and a vertex positioned on the lower side is the second vertex q2. In addition, the third vertex q3, the fourth vertex q4, and the fifth vertex q5 are vertexes not positioned on the first side 3A.

Specifically, the first side 3A is contacted with the first surface 2a of the first substrate 2. The second side 3B is extended approximately vertically to the first side 3A and configures the first vertex q1 together with the first side 3A. The third side 3C is a side connecting the third vertex q3 and the fourth vertex q4 with each other, the fourth side 3D is a side connecting the third vertex q3 and the fifth vertex q5 with each other, and the fifth side 3E is a side connecting the fifth vertex q5 and the second vertex q2 with each other.

A length L of a perpendicular line of the first side 3A passing the third vertex q3 is longer than lengths $L_1$ and $L_2$ of perpendicular lines of the first side 3A passing the vertex q4 and the vertex q5 other than the third vertex q3 among the five vertexes q1 to q5 described above.

A vertex positioned on one side (upper side) of the perpendicular line of the first side 3A passing the third vertex q3 is the fourth vertex q4 and a vertex positioned on the other side (lower side) thereof is the fifth vertex q5. The length $L_1$ of the perpendicular line of the first side 3A passing the fourth vertex q4 is longer than the length $L_2$ of the perpendicular line of the first side 3A passing the fifth vertex q5.

An angle θ1 formed by the third side 3C and the perpendicular line of the first side 3A passing the third vertex q3 is greater than an angle θ2 formed by the fourth side 3D and the perpendicular line of the first side 3A passing the third vertex q3.

The length $L_2$ of the perpendicular line of the first side 3A passing the fifth vertex q5 is longer than ½ of the length of the perpendicular line of the first side 3A passing the third vertex q3.

That is, the lighting unit 3 of this embodiment is a polygonal prism-shaped structure in which the shapes of both sides are asymmetrical with the perpendicular line of the first side 3A passing the third vertex q3 as the center and the sectional shape is a pentagon.

Returning to FIG. 1, when a width of the lighting unit 3 in a short direction is W, a height of the first substrate 2 of the lighting unit 3 in a normal direction is L, and a pitch of the lighting unit 3 in an arrangement direction is P, the width W of the lighting unit 3 in the short direction, the height L thereof, and the pitch P thereof are respectively equivalent over all of the lighting units 3.

Air may exist in the gap 9 provided between the lighting units 3 adjacent in the width direction. Accordingly, a refractive index of the gap 9 is approximately 1.0. By setting the refractive index of the gap 9 as 1.0, a critical angle in the interfaces of the gap 9 and the lighting unit 3 (first side 3A to fifth side 3E) becomes minimum. In a case of this embodiment, air exists in the gap 9, but inert gas such as nitrogen may exist in the gap 9 or the gap 9 may be in a reduced-pressure state.

It is desirable that a refractive index of the first substrate 2 and a refractive index of the lighting unit 3 are approximately equivalent to each other. The reason thereof is as follows. When the light is incident to the first substrate 2 from the lighting unit 3, in a case where the refractive index of the first substrate 2 and the refractive index of the lighting unit 3 are significantly different from each other, for example, unnecessary refraction or reflection of light may occur in the interfaces between the lighting unit 3 and the first substrate 2. In this case, desired lighting properties may not be obtained and luminance may decrease.

The first adhesive layer 4 causes the first surface 2a of the first substrate 2 and an inner surface 8a of the window glass 8 to adhere to each other. The first adhesive layer 4 may be provided on the first surface 2a of the first substrate 2 as a constituent element of the lighting film 1 from the first stage, or may not be provided. In a case where the first adhesive layer 4 is not provided, the first adhesive layer may be supplied to the first surface 2a of the first substrate 2, when performing an operation of bonding the lighting film 1 to the window glass 8. A general optical adhesive is used as the first adhesive layer 4. A refractive index of the first adhesive layer 4 is desirably equivalent to the refractive index of the first substrate 2 or the refractive index of the window glass 8. No refraction occurs in the interfaces between the first adhesive layer 4 and the first substrate 2 or the interfaces between the first adhesive layer 4 and the window glass 8.

The lighting film 1 having such a configuration described above is, for example, used by being bonded to the window glass 8 in a state where a surface side (first surface 2a side of the first substrate 2) where the plurality of lighting units 3 are formed opposes the inner surface 8a (surface on the indoor side) of the window glass 8. At this time, the lighting film 1 is bonded to the window glass 8 so that the longitudinal direction of the lighting unit 3 faces a horizontal direction and the arrangement direction of the plurality of lighting units 3 faces a vertical direction. Specifically, as shown in FIG. 2, the lighting film is bonded to the window glass in a direction in which a side of a large area with respect to the perpendicular line of the first side 3A of the third vertex q3 of the lighting unit 3 becomes a lower side in the vertical direction and the second side 3B of the lighting unit 3 becomes an upper surface.

Light directly travelling from the sun is incident to the lighting film 1 installed on the window glass 8 from the obliquely above. The light incident to the lighting film 1 reaches the lighting units 3 through the window glass 8.

Here, for convenience of the description, a point where an arbitrary beam of the light incident to the lighting unit 3 shown in FIG. 1 is incident to the fifth side 3E (refraction side) of the lighting unit 3 is set as a light incoming point. A virtual straight line which passes through the light incoming point and is orthogonal to the first surface 2a of the first substrate 2 is set as a straight line f. Among two spaces having a horizontal plane containing the straight line f as the boundary, a space on a side where light incident to the light incoming point exists is set as a first space S1 and a space on a side where light incident to the light incoming point does not exist is set as a second space S2.

For example, the light L1 incident from the fourth side 3D of the lighting unit 3 is totally reflected by the fifth side 3E of the lighting unit 3, travels obliquely upwards, that is, towards the side of the first space S1, and is output from the first side 3A of the lighting unit 3. The light L1 incident from the lighting unit 3 transmits the first substrate 2 and is output to the ceiling in a room from the lighting film 1. The light output from the lighting film 1 to the ceiling is reflected by the ceiling and illuminates the inside of a room, and thus, the light is used as illumination light. Therefore, in a case where such a lighting film 1 is used, it is possible to expect an energy saving effect of saving energy consumed by illumination equipment in a building in the daytime.

Figure 4:
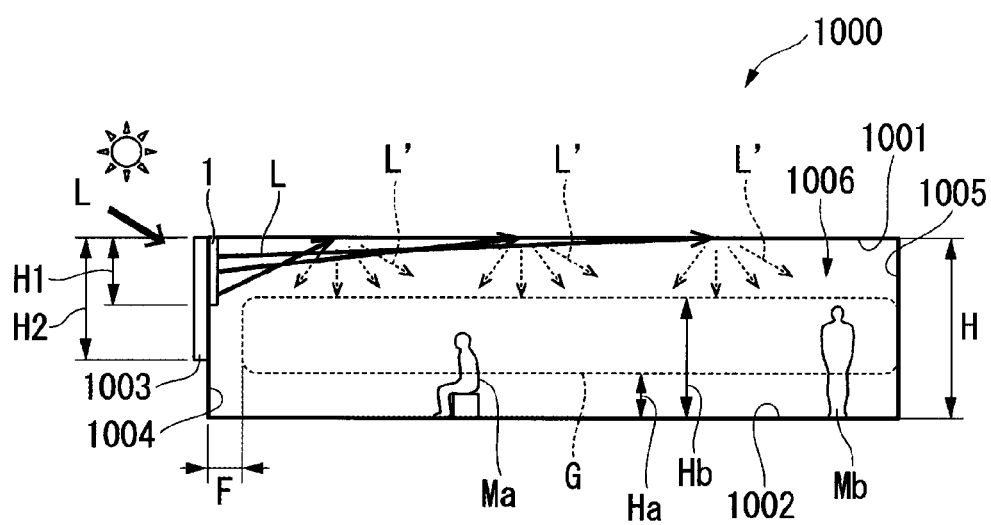
FIG. 4 is a schematic view showing an example of a room model.

Here, lighting properties of the lighting film 1 will be described by using a room model 1000 shown in FIG. 4. FIG. 4 is a schematic view showing an example of the room model 1000.

The room model 1000 is, for example, a model made by assuming the usage of the lighting film 1 in an office. Specifically, the room model 1000 shown in FIG. 4 shows a case where outdoor light L which has passed the window glass 1003 is incident, from the obliquely above, to a room 1006 surrounded by a ceiling 1001, a floor 1002, a front side wall 1004 to which the window glass 1003 is attached, and a rear side wall 1005 opposing the front side wall 1004. The lighting film 1 is bonded to an upper portion side of an inner surface of the window glass 1003 (corresponding to the window glass 8 described above).

In the room model 1000, a height dimension (dimension from the ceiling 1001 to the floor 1002) H of the room 1006 is set as 2.7 m, a form length H2 of the window glass 1003 is set as 1.8 m from the ceiling 1001, and a form length H1 of the lighting film 1 is set as 0.6 m from the ceiling 1001.

In the room model 1000, A person Ma sitting in a chair in the center of the room 1006 and a person Mb standing on the floor 1002 is in the rear side of the room 1006. A height lower limit Ha of the eyes of the person Ma sitting in a chair is set as 0.8 m from the floor 1002 and a height upper limit Hb of the eyes of the person Mb standing on the floor 1002 is set as 1.8 m from the floor 1002.

An area (hereinafter, referred to as a glare area) G where the persons Ma and Mb in the room 1006 are dazzled is a range of the heights Ha and Hb of the eyes of the persons Ma and Mb in the room. The vicinity of the window glass 1003 of the room 1006 is mainly an area F to which the outdoor light L is directly incident through a lower portion side of the window glass 1003 to which the lighting film 1 is not attached. This area F is a range of 1 m from the front side wall 1004. Accordingly, the glare area G is a range from a position separated from the front side wall 1004 excluding the area F by 1 m to the rear side wall 1005, among the height range of 0.8 m to 1.8 m from the floor 1002.

The glare area G is an area regulated substrated on the position of the eyes in the area where persons move. Even when the room 1006 is brightly illuminated with the light travelling to the ceiling 1001 side, a person in the room 1006 easily feel uncomfortable, when the quantity of light approaching the glare area G is great.

The lighting film 1 of this embodiment may relatively increase luminance of light travelling to the ceiling 1001 while decreasing luminance of light travelling to the glare area G, among light L incident to the room 1006 through the window glass 1003. The light L' reflected by the ceiling 1001 brightly illuminates the room 1006 over a wide range as the illumination light. In this case, it is possible to expect an energy saving effect of saving energy consumed by illumination equipment in the room 1006 in the daytime, by turning off the illumination equipment of the room 1006.

Next, definitions of a light incoming angle $\theta_{IN}$ of incoming light $L_{IN}$ incident to the lighting unit 3 of the lighting film 1 and a light outgoing angle $\theta_{OUT}$ of outgoing light Lour output from the second surface 2b of the first substrate 2 will be described with reference to FIG. 5A to FIG. 5G.

Figure 5A:
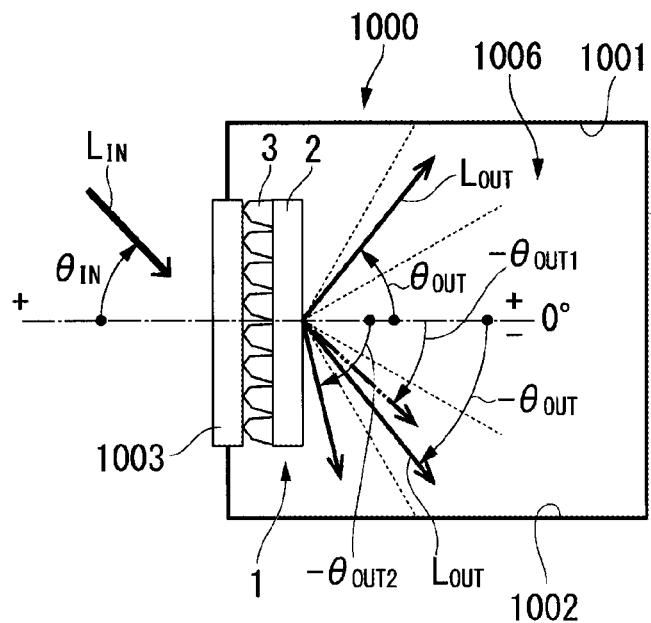
FIG. 5A is a diagram illustrating definitions of a light incoming angle $\theta_{IN}$ of incoming light $L_{IN}$ incident to the lighting units of the lighting film and a light outgoing angle $\theta_{OUT}$ of outgoing light $L_{OUT}$ output from a second surface $2b$ of a first substrate 2.

FIG. 5A is a diagram illustrating definitions of the light incoming angle $\theta_{IN}$ of the incoming light $L_{IN}$ incident to the lighting unit 3 of the lighting film 1 and the light outgoing angle $\theta_{OUT}$ of the outgoing light $L_{OUT}$ output from the second surface 2b of the first substrate 2. FIG. 5B to FIG. 5G are diagrams showing travelling directions of the outgoing light. FIG. 4 is suitably referred.

As shown in FIG. 5A, when an angle of a direction along the normal line of the first substrate 2 is set as 0°, the sun is always on the upper side than the normal line of the first substrate 2, and accordingly, the light incoming angle $\theta_{IN}$ of the incoming light $L_{IN}$ from the sun (clockwise angle with respect to the normal line) is defined to be positive (+). In the light outgoing angle $\theta_{OUT}$ of the outgoing light $L_{OUT}$, a counterclockwise angle with respect to the normal line is set to be positive (+) and a clockwise angle with respect to the normal line is set to be negative (−). That is, in the light outgoing angle $\theta_{OUT}$, an angle on the upper side of the normal line of the first substrate 2 and in a direction facing the ceiling 1001 is set to be positive (+) and an angle on the lower side of the normal line of the first substrate 2 and in a direction facing the floor 1002 is set to be negative (−).

The light incoming angle of light incident to the lighting film 1 changes depending on altitude change of the sun.

Figure 5B:
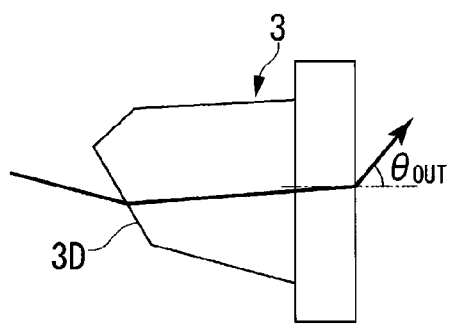
FIG. 5B is a first diagram showing a travelling direction of the outgoing light.
Figure 5C:
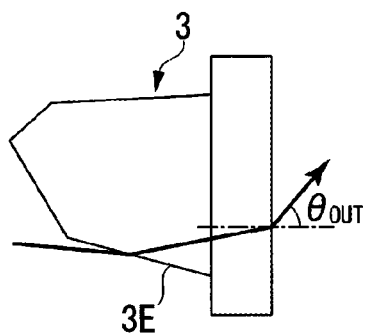
FIG. 5C is a second diagram showing a travelling direction of the outgoing light.
Figure 5D:
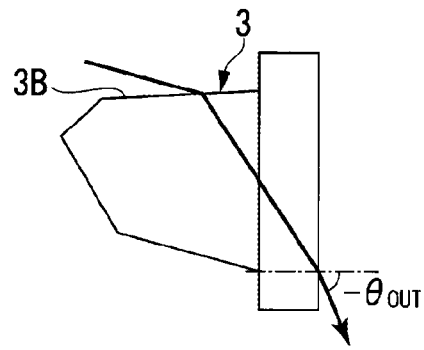
FIG. 5D is a third diagram showing a travelling direction of the outgoing light.
Figure 5E:
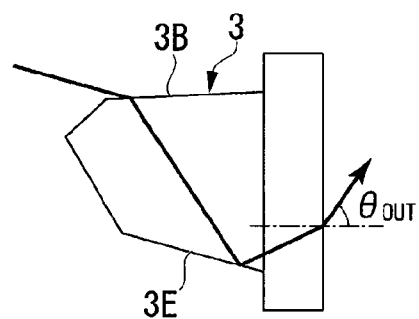
FIG. 5E is a fourth diagram showing a travelling direction of the outgoing light.
Figure 5F:
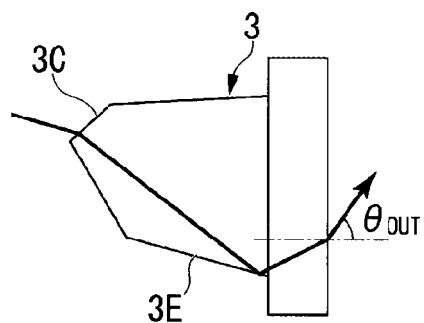
FIG. 5F is a fifth diagram showing a travelling direction of the outgoing light.

As shown in FIG. 5B and FIG. 5C, in a case where the altitude of the incoming light Lm incident to the lighting film 1 is low (light incoming angle $\theta_{IN} \leq 20°$ C.), the incoming light $L_{IN}$ incident to the fourth side 3D or the fifth side 3E of the lighting unit 3 is reflected and output by the light outgoing angle $\theta_{OUT} > 0°$. As shown in FIG. 5D, the incoming light $L_{IN}$ incident to the second side 3B of the lighting unit 3 is light which is reflected by the second side 3B and travels to the floor 1002. Here, when an light outgoing angle equivalent to the light incoming angle $\theta_{IN}$ is set as a light outgoing angle $-\theta_{OUT1}$ among the negative light outgoing angles $\theta_{OUT}$ travelling to the floor 1002, the incoming light $L_{IN}$ incident to the second side 3B of the lighting unit 3 is reflected by the second side 3B, output by a light outgoing angle $-\theta_{OUT2} \leq -\theta_{OUT1}$ $(-\theta_{OUT1}=\theta_{IN})$, and travels to the side of the area F (FIG. 4) close to the window glass 1003 in the floor 1002 of the room 1006. As shown in FIG. 5E and FIG. 5F, the light is incident to the second side 3B or the third side 3C, is reflected by the fifth side 3E, is output by the light outgoing angle $\theta_{OUT} \geq 0°$, and travels to the ceiling 1001.

Figure 5G:
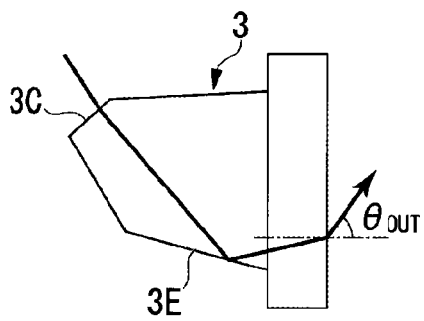
FIG. 5G is a sixth diagram showing a travelling direction of the outgoing light.

Meanwhile, as shown in FIG. 5G, in a case where the altitude of the incoming light $L_{IN}$ incident to the lighting unit 3 is high (light incoming angle $\theta_{IN} \geq 20°$ C.), most of the light is incident to the third side 3C, reflected by the fifth side 3E, and output by the light outgoing angle $\theta_{OUT} \geq 0°$. In general, the altitude of the sun throughout the year in Japan is approximately 23° to 80°. The incoming light from the sun at such an altitude is reflected by the window glass 8 and incident to the third side 3C which is approximately orthogonal to a light path thereof.

Next, an example of a light path of light transmitting the lighting unit 3 will be described.

FIG. 6A to FIG. 6E are diagrams showing light paths of light transmitting the lighting unit 3.

Figure 6A:
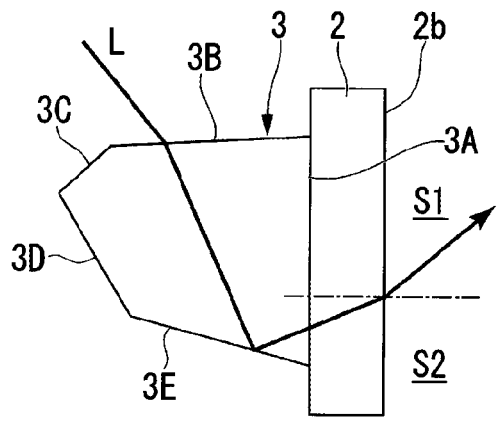
FIG. 6A is a first diagram showing a light path of light transmitting the lighting unit of the first embodiment.

As shown in FIG. 6A, the light L incident from the second side 3B of the lighting unit 3 is totally reflected by the fifth side 3E of the lighting unit 3, travels obliquely upwards, and output to the first space S1 side from the second surface 2b of the first substrate 2 (interface between the second surface 2b and the interior space).

Figure 6B:
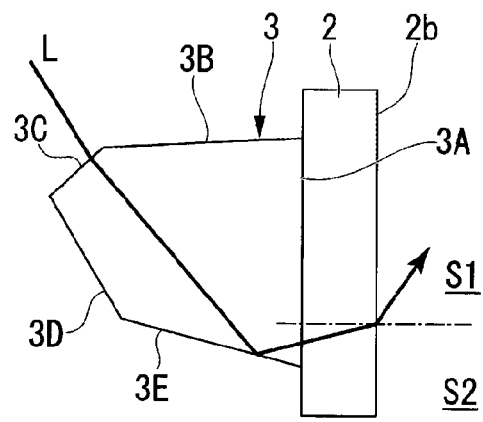
FIG. 6B is a second diagram showing a light path of light transmitting the lighting unit of the first embodiment.

As shown in FIG. 6B, the light L incident from the third side 3C of the lighting unit 3 is totally reflected by the fifth side 3E of the lighting unit 3, travels to obliquely upwards, is further refracted by the second surface 2b of the first substrate 2, and is output towards the first space S1 side.

Figure 6C:
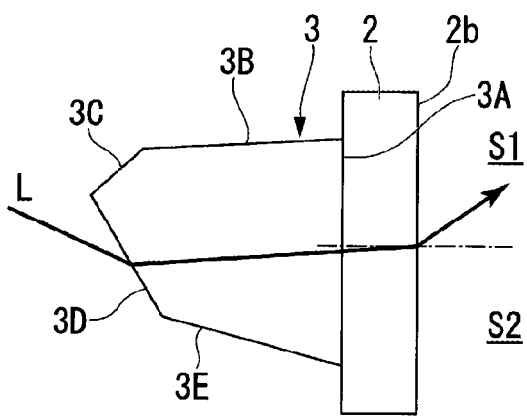
FIG. 6C is a third diagram showing a light path of light transmitting the lighting unit of the first embodiment.

As shown in FIG. 6C, the light L incident from the fourth side 3D of the lighting unit 3 is refracted by the fourth side 3D, travels obliquely upwards, is further refracted by the second surface 2b of the first substrate 2 obliquely upwards, and is output towards the first space S1.

Figure 6D:
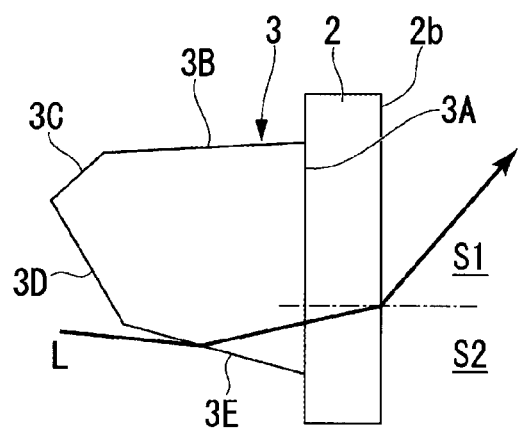
FIG. 6D is a fourth diagram showing a light path of light transmitting the lighting unit of the first embodiment.

As shown in FIG. 6D, the light L incident from the fifth side 3E of the lighting unit 3 is refracted by the fifth side 3E of the lighting unit 3, travels obliquely upwards, is further refracted by the second surface 2b of the first substrate 2 obliquely upwards, and is output towards the first space S1.

As the lighting film 1 of this embodiment, when each sectional shape of the plurality of lighting units 3 is set as a polygonal shape (pentagon) which is asymmetrical with the normal direction of the first side 3A passing the third vertex q3 as the center, in a case where the altitude of light incident to the lighting unit 3 is low (light incoming angle $\theta_{IN} \leq 20°$ C.), most of the light may be incident to the fourth side 3D or the fifth side 3E and output by the light outgoing angle $\theta_{OUT} > 0°$.

In addition, in a case where the altitude of light incident to the lighting unit 3 is high (light incoming angle $\theta_{IN} > 20°$ C.), most of the light may be incident to the third side C, reflected by the fifth side 3E, and output by the light outgoing angle $\theta_{OUT} \geq 0°$.

According to the configuration of the lighting film 1 of this embodiment, it is possible to efficiently cause the light L incident to the room 1006 through the window glass 1003 (lighting film 1) to travel to the ceiling 1001. In this embodiment, it is possible to relatively increase luminance of light travelling to the ceiling 1001 while decreasing luminance of light travelling to the glare area G or light travelling to the floor 1002, among the light L incident to the room 1006 through the window glass 1003. Therefore, the glare light is prevented to not cause the persons Ma and Mb in the room 1006 to be dazzled, and it is possible to ensure a bright environment of the room 1006 by sufficiently using outdoor natural light (sunlight).

Figure 6E:
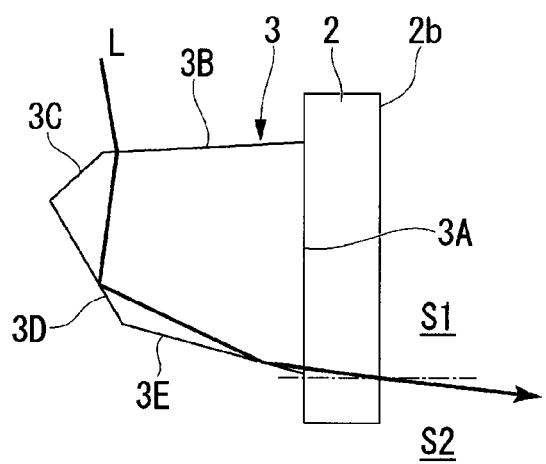
FIG. 6E is a fifth diagram showing a light path of light transmitting the lighting unit of the first embodiment.

However, as shown in FIG. 6E, in a case where the altitude of the sun is high (for example, light incoming angle $\theta_{IN} > 80°$), the light L incident to the lighting film 1 may be incident from the second side 3B of the lighting unit 3. The light L incident from the second side 3B of the lighting unit 3 is totally reflected by the fourth side 3D of the lighting unit 3, is further reflected by the fifth side 3E, travels obliquely downwards, and is output towards the second space S2 from the second surface 2b of the first substrate 2.

Although it is slight, the outgoing light described above may be output towards to the glare area G to cause the persons Ma and Mb in the room 1006 as shown in FIG. 4 to be dazzled. Therefore, the inventors have proposed a structure for decreasing such glare light. Hereinafter, the structure will be described in detail.

[Second Embodiment]

Next, a lighting film 12 of a second embodiment of the invention will be described.

A basic configuration of the lighting film 12 of this embodiment shown below is approximately the same as that of the first embodiment, but a sectional shape of a lighting unit 13 is different therefrom. Accordingly, in the following description, the shape of the lighting unit 13 will be described in detail and the description of common parts will be omitted. In each drawing used in the description, the same reference numerals are used for constituent elements which are common with those in FIG. 1 to FIG. 6E.

Figure 7:
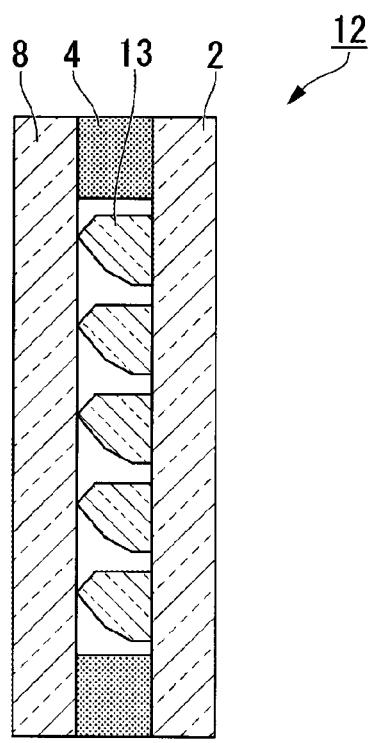
FIG. 7 is a diagram showing an overall configuration of a lighting film of a second embodiment.

FIG. 7 is a diagram showing an overall configuration of the lighting film 12 of the second embodiment.

Figure 8:
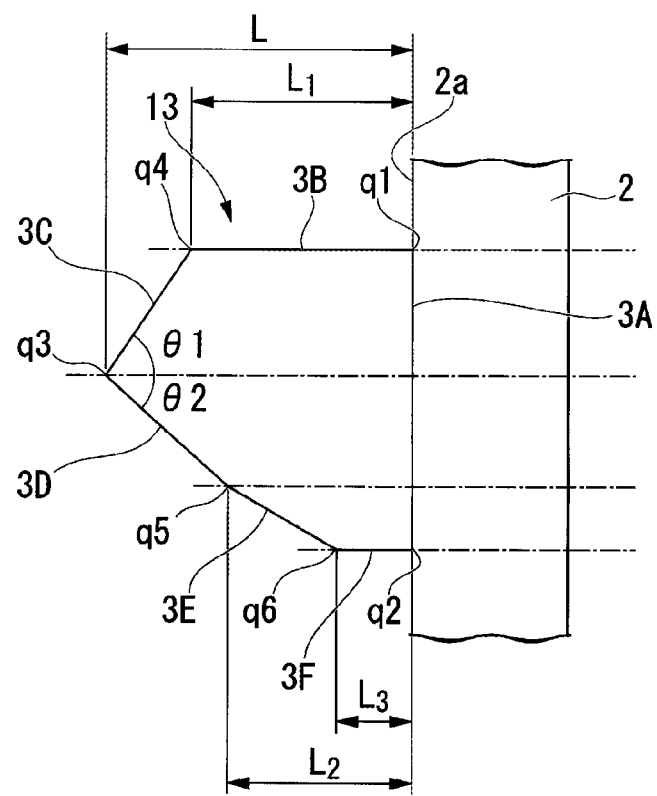
FIG. 8 is a diagram showing a sectional shape of the lighting unit of the second embodiment.

FIG. 8 is a diagram showing a sectional shape of the lighting unit 13 of the second embodiment.

As shown in FIG. 7, the lighting film 12 of this embodiment includes the plurality of lighting units 13 of which a sectional shape orthogonal to the longitudinal direction is a hexagon.

As shown in FIG. 7 and FIG. 8, each of the plurality of lighting units 13 includes the first side 3A, the second side 3B, the third side (second side) 3C, the fourth side (third side) 3D, the fifth side 3E, a sixth side 3F, the first vertex q1, the second vertex q2, the third vertex q3, the fourth vertex q4, the fifth vertex q5, and a sixth vertex q6, and the first side 3A side is contacted with the first surface 2a of the first substrate 2.

In the lighting unit 13, among vertexes corresponding to both sides of the first side 3A contacted with the first surface 2a of the first substrate 2, a vertex positioned on the upper side is the first vertex q1, and a vertex positioned on the lower side is the second vertex q2. The third vertex q3 is a vertex which is not positioned on the first side 3A and is most separated from the first side 3A. A vertex positioned on the upper side of the perpendicular line of the first side 3A passing the third vertex q3 is the fourth vertex q4. Among two vertexes positioned on the lower side of the perpendicular line of the first side 3A passing the third vertex q3, a vertex far from the first side 3A is the fifth vertex q5, and a vertex close to the first side 3A is the sixth vertex q6.

The length L of a perpendicular line of the first side 3A passing the third vertex q3 is longer than lengths $L_1$, $L_2$, and $L_3$ of perpendicular lines of the first side 3A passing the vertexes q4, q5, and q6 other than the third vertex q3 among the plurality of vertexes.

The length $L_1$ of the perpendicular line of the first side 3A passing the fourth vertex q4 is longer than the length L2 of the perpendicular line of the first side 3A passing the fifth vertex q5.

The length $L_2$ of the perpendicular line of the first side 3A passing the fifth vertex q5 is longer than ½ of the length L of the perpendicular line of the first side 3A passing the third vertex q3.

Here, an angle θ1 formed by the perpendicular line of the first side 3A passing the third vertex q3 and the third side (second side) 3C is greater than an angle θ2 formed by the perpendicular line of the first side 3A passing the third vertex q3 and the fourth side (third side) 3D.

As described above, the lighting unit 13 of this embodiment has a shape having both sides are asymmetrical with the perpendicular line of the first side 3A passing the third vertex q3 as the center. That is, the lighting unit has a shape in which the volume of the lower part including the fifth vertex q5 and the sixth vertex q6 is greater than the volume of the upper part including the first vertex q1 and the fourth vertex q4.

FIG. 9A to FIG. 9G are diagram showing light paths of light passing the light unit.

Figure 9A:
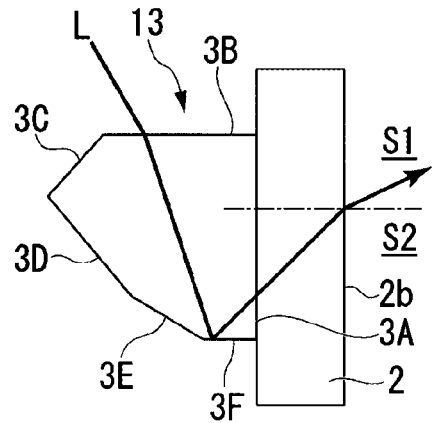
FIG. 9A is a first diagram showing a light path of light transmitting the lighting unit of the second embodiment.

As shown in FIG. 9A, the light L incident from the second side 3B of the lighting unit 3 is totally reflected by the sixth side 3F of the lighting unit, travels obliquely upwards, is further refracted by the second surface 2b of the first substrate 2 (interface between the second surface 2b and the interior space) obliquely upwards, and is output towards the first space S1 side.

Figure 9B:
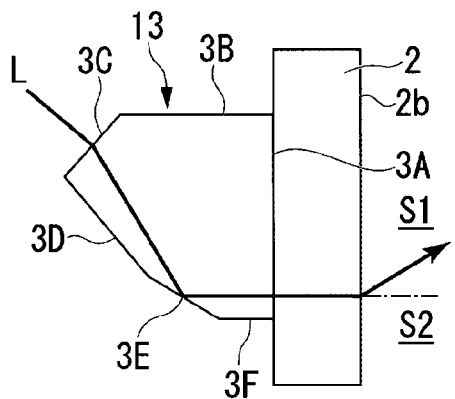
FIG. 9B is a second diagram showing a light path of light transmitting the lighting unit of the second embodiment.

As shown in FIG. 9B, the light L incident from the third side 3C of the lighting unit 3 is totally reflected by the fifth side E of the lighting unit 3, travels approximately in the horizontal direction, is further refracted by the second surface 2b of the first substrate 2 obliquely upwards, and is output towards the first space S1 side.

Figure 9C:
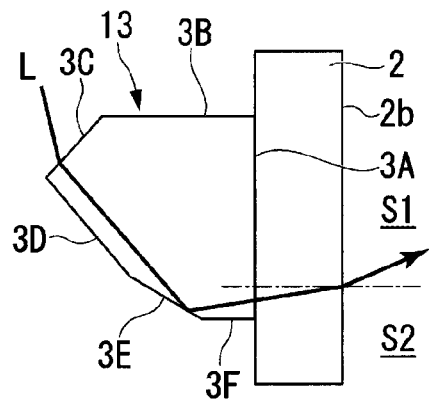
FIG. 9C is a third diagram showing a light path of light transmitting the lighting unit of the second embodiment.

As shown in FIG. 9C, the light L incident from the third side 3C of the lighting unit 3 is refracted by the fifth side 3E, travels obliquely upwards, is further refracted by the second surface 2b of the first substrate 2 obliquely upwards, and is output towards the first space S1.

Figure 9D:
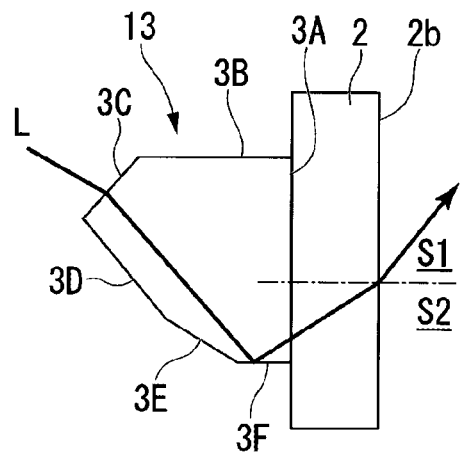
FIG. 9D is a fourth diagram showing a light path of light transmitting the lighting unit of the second embodiment.

As shown in FIG. 9D, the light L incident from the third side 3C of the lighting unit 3 is totally reflected by the sixth side 3F of the lighting unit 3, travels obliquely upwards, is further refracted by second surface 2b of the first substrate 2 obliquely upwards, and is output towards the first space S1.

Figure 9E:
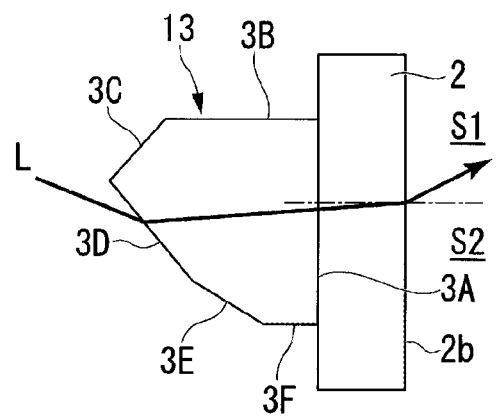
FIG. 9E is a fifth diagram showing a light path of light transmitting the lighting unit of the second embodiment.

As shown in FIG. 9E, the light L incident from the fourth side 3D of the lighting unit 3 is refracted by the fourth side 3D, travels obliquely upwards, is further refracted by the second surface 2b of the first substrate 2 obliquely upwards, and is output towards the first space S1.

Figure 9F:
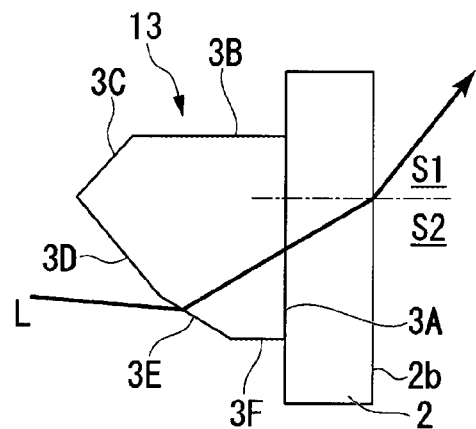
FIG. 9F is a sixth diagram showing a light path of light transmitting the lighting unit of the second embodiment.

As shown in FIG. 9F, the light L incident from the fifth side 3E of the lighting unit 3 is refracted by the fifth side 3E, travels obliquely upwards, is further refracted by the second surface 2b of the first substrate 2 obliquely upwards, and is output towards the first space S1.

Figure 9G:
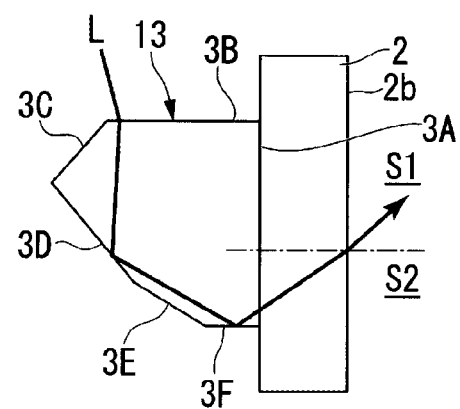
FIG. 9G is a seventh diagram showing a light path of light transmitting the lighting unit of the second embodiment.

As shown in FIG. 9G, the light L incident from the second side 3B of the lighting unit 3 is refracted by the second side 3B, is totally reflected by the fourth side 3D and the sixth side 3F sequentially, travels obliquely upwards, is further refracted by the second surface 2b of the first substrate 2 obliquely upwards, and is output towards the first space S1.

As described above, also in the configuration of the lighting film 12 of this embodiment, it is possible to relatively increase luminance of light travelling to the ceiling 1001 while decreasing luminance of light travelling to the glare area G or light travelling to the floor 1002, among the light L incident to the room 1006 through the window glass 1003.

In this embodiment, by setting the sectional shape of the lighting unit 13 as a hexagon, it is possible to prevent glare light, regardless of the altitude change of the sun (light incoming angle). That is, when the shape of the lighting unit 13 of this embodiment is set, it is possible to totally reflect the light L incident from the second side 3B of the lighting unit 13 with the high altitude of the sun by the sixth side 3F obliquely upwards, as shown in FIG. 9G. Accordingly, even in a case where the light incoming angle of light incident to the lighting film 12 (window glass 8) changes depending on altitude change of the sun, an effect of further decreasing glare light is obtained.

[Third Embodiment]

Hereinafter, a lighting film 22 of a third embodiment of the invention will be described.

A basic configuration of the lighting film 22 of this embodiment is approximately the same as that of the first embodiment, but a sectional shape of a lighting unit 23 is different therefrom. Accordingly, in the following description, the shape of the lighting unit 23 will be described in detail and the description of common parts will be omitted. In each drawing used in the description, the same reference numerals are used for constituent elements which are common with those in FIG. 1 to FIG. 5G.

Figure 10:
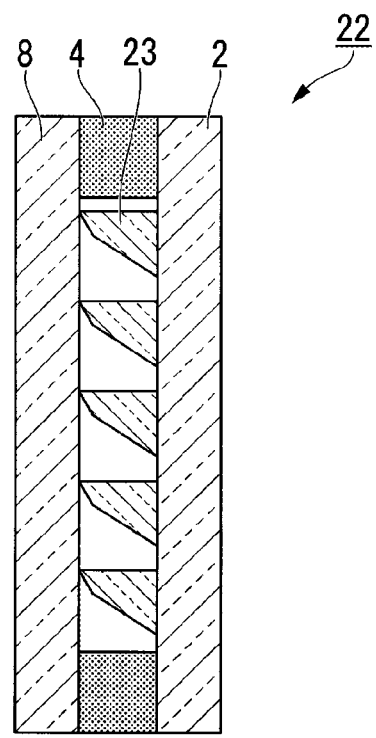
FIG. 10 is a diagram showing an overall configuration of a lighting film of a third embodiment.

FIG. 10 is a diagram showing an overall configuration of the lighting film 22 of the third embodiment.

Figure 11:
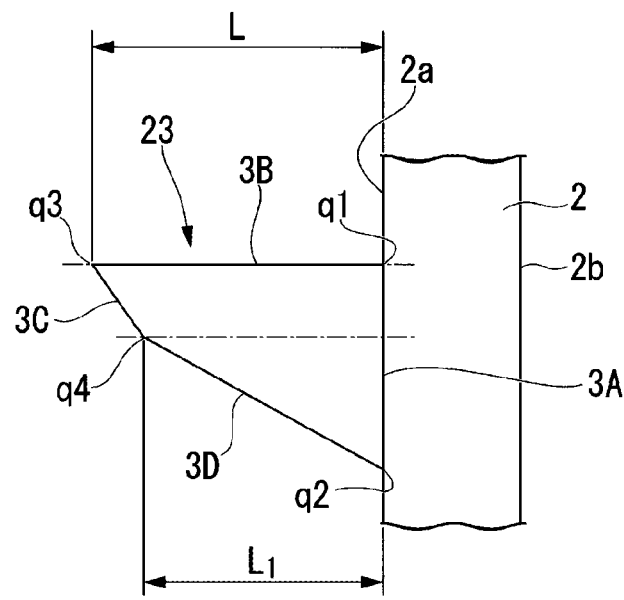
FIG. 11 is a diagram showing a sectional shape of the lighting unit of the third embodiment.

FIG. 11 is a diagram showing a sectional shape of the lighting unit 23 of the third embodiment.

As shown in FIG. 10, the lighting film 22 of this embodiment includes the plurality of lighting units 23 of which a sectional shape orthogonal to the longitudinal direction is a square.

As shown in FIG. 10 and FIG. 11, each of the plurality of lighting units 23 includes the first side 3A, the second side 3B, the third side (second side) 3C, the fourth side (third side) 3D, the first vertex q1, the second vertex q2, the third vertex q3, and the fourth vertex q4, and the first side 3A side is contacted with the first surface 2a of the first substrate 2.

In the lighting unit 23, among vertexes corresponding to both sides of the first side 3A contacted with the first surface 2a of the first substrate 2, a vertex positioned on the upper side is the first vertex q1, and a vertex positioned on the lower side is the second vertex q2. The third vertex q3 is a vertex which is not positioned on the first side 3A and is most separated from the first side 3A. A vertex positioned on the lower side of the perpendicular line of the first side 3A passing the third vertex q3 is the fourth vertex q4.

The length L of a perpendicular line of the first side 3A passing the third vertex q3 is longer than the length $L_1$ of a perpendicular line of the first side 3A passing the fourth vertex q4.

The lighting unit 23 of this embodiment has a shape in which approximately the total volume exists in the lower portion of the perpendicular line of the first side 3A passing the third vertex q3. Accordingly, the lighting unit 13 has a shape having both sides are asymmetrical with the perpendicular line of the first side 3A passing the third vertex q3 as the center, and has a shape having both sides are asymmetrical with the perpendicular line of the first side 3A passing the fourth vertex q4 as the center.

Figure 12:
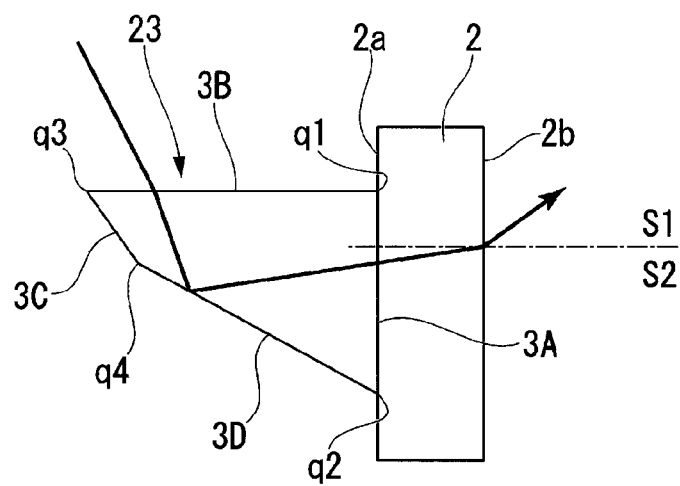
FIG. 12 is a diagram showing a light path of light incident to the lighting unit of the third embodiment.

FIG. 12 is a diagram showing a light path of light incident to the lighting unit of the third embodiment. As shown in FIG. 12, the light L incident to the second side 3B of the lighting unit 23 is totally reflected by the fourth side 3D, travels obliquely upwards, is further refracted by the second surface 2b of the first substrate 2 obliquely upwards, and is output towards the first space S1.

As described above, also in the configuration of the lighting film 22 of this embodiment, it is possible to relatively increase luminance of light travelling to the ceiling 1001 while decreasing luminance of light travelling to the glare area G or light travelling to the floor 1002, among the light L incident to the room 1006 through the window glass 1003 shown in FIG. 4. That is, it is possible to efficiently illuminate the ceiling 1001 with the light L incident to the room 1006 through the window glass 1003. In addition, it is possible to illuminate the deep portion of the room 1006 with the light L travelling to the ceiling 1001, without causing the persons Ma and Mb in the room 1006 to be dazzled.

[Fourth Embodiment]

Next, a lighting film 32 of a fourth embodiment of the invention will be described.

A basic configuration of the lighting film 32 of this embodiment shown below is approximately the same as that of the first embodiment, but a structure of periphery of a lighting unit is different therefrom. Accordingly, in the following description, the structure of periphery of the lighting unit will be described in detail and the description of common parts will be omitted. In each drawing used in the description, the same reference numerals are used for constituent elements which are common with those in FIG. 1 to FIG. 6E.

Figure 13:
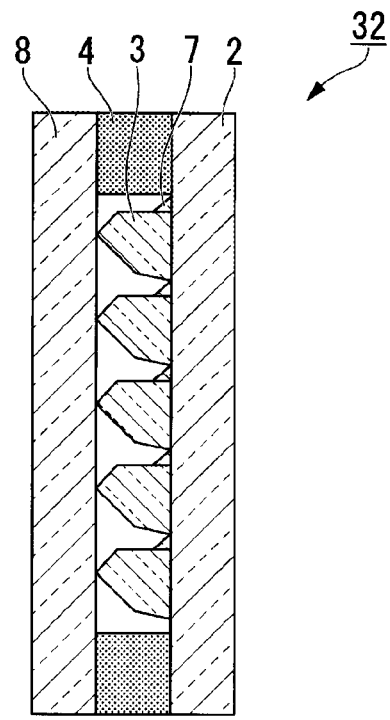
FIG. 13 is a diagram showing an overall configuration of a lighting film of a fourth embodiment.

FIG. 13 is a diagram showing an overall configuration of the lighting film 32 of the fourth embodiment.

Figure 14:
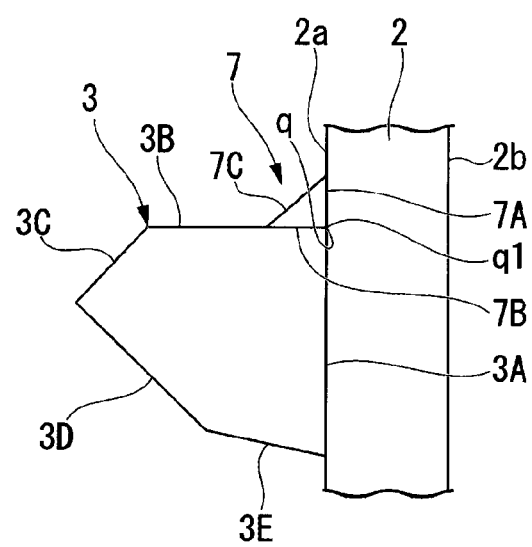
FIG. 14 is a sectional view showing a structure of periphery of a lighting unit of the fourth embodiment.

FIG. 14 is a sectional view showing a structure of the periphery of the lighting unit of the fourth embodiment.

As shown in FIG. 13, the lighting film 32 of this embodiment includes the plurality of lighting units 3 of which a sectional shape orthogonal to the longitudinal direction is a pentagon, and a plurality of auxiliary lighting units 7 each of which is disposed between the adjacent lighting units 3.

The auxiliary lighting unit 7 is formed of a polygonal prism-shaped structure having optical transparency and may be formed by using the same material as that of the lighting unit 3. As shown in FIG. 13 and FIG. 14, the auxiliary lighting unit 7 extends in a linear elongated shape in one direction (direction orthogonal to the space of FIG. 13) in parallel with the lighting unit 3, and a sectional shape orthogonal to a longitudinal direction is a triangle. Specifically, as shown in FIG. 14, the auxiliary lighting unit includes a first side 7A contacted with the first surface 2a of the first substrate 2, a second side 7B contacted with the second side 3B of one adjacent lighting unit 3, and a remaining third side 7C connecting the first side 7A and the second side 7B with each other. The third side 7C is tilted to a side opposite to the tilt of a side (the fourth side 3D and the fifth side 3E) positioned on a side where the area with respect to the perpendicular line of the first side 3A of the third vertex q3 of the lighting unit 3 is large.

Here, among a plurality of vertexes of the auxiliary lighting unit 7, a vertex q configured with the first side 7A and the second side 7B coincides with the first vertex q1 of the lighting unit 3. That is, the auxiliary lighting unit 7 is provided on the second side 3B of the lighting unit and the first surface 2a of the first substrate 2 without any gap.

Figure 15A:
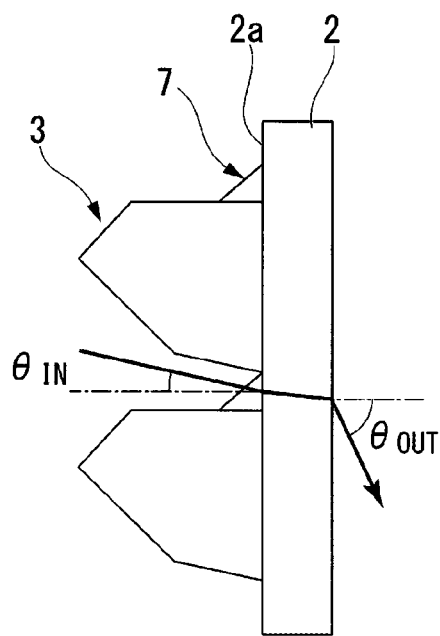
FIG. 15A is a diagram showing a light path of light transmitting an auxiliary lighting unit between adjacent lighting units.
Figure 15B:
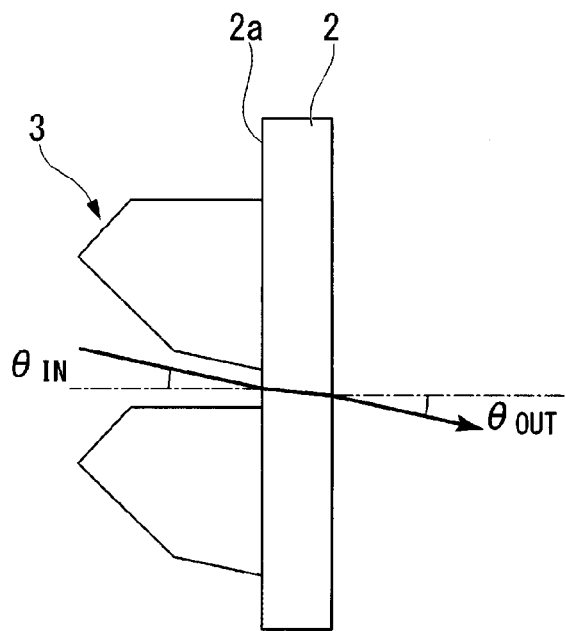
FIG. 15B is a schematic view showing a light path of light incident to a gap between adjacent lighting units.

FIG. 15A is a diagram showing a light path of light transmitting the auxiliary lighting unit 7 between the adjacent lighting units 3. FIG. 15B is a schematic view showing a light path of light incident to a gap between the adjacent lighting units 3.

As shown in FIG. 15B, when forming the plurality of lighting units 3 on the first substrate 2, a gap may be formed between the lighting units 3. In this case, some light incident to the lighting film at the low altitude may directly leaked from the first substrate 2 exposed from the gap between the adjacent lighting units 3 and become glare light.

In this embodiment, in order to prevent this problem, the auxiliary lighting unit 7 is provided between the adjacent lighting units 3 to fill the gap, as shown in FIG. 15A. Therefore, it is possible to refract the light not incident to the lighting unit 3 by the auxiliary lighting unit 7 and output ($\theta_{OUT} < \theta_{IN}$) the light. As shown in FIG. 4, the light becomes light travelling to the area F close to the side wall 1004 of the room 1006, that is, the floor 1002 side. As described above, it is possible to prevent glare light which causes the persons Ma and Mb in the room 1006 to be dazzled.

Figure 16:
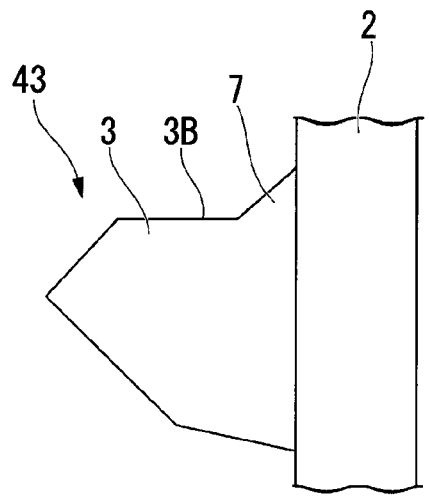
FIG. 16 is a diagram showing a modification example of the lighting unit of the fourth embodiment.

In this embodiment, the auxiliary lighting unit 7 separately formed is disposed between the adjacent lighting units 3, but as shown in FIG. 16, an auxiliary attached lighting unit 43 obtained by integrally forming one adjacent lighting unit 3 and the auxiliary lighting unit 7 may be used. Here, the auxiliary lighting unit 7 is integrally formed on the second side 3B side of the lighting unit 3.

[Fifth Embodiment]

Next, a lighting film 42 of a fifth embodiment of the invention will be described.

A basic configuration of the lighting film 42 of this embodiment shown below is approximately the same as that of the fourth embodiment, but a structure of periphery of a lighting unit is different therefrom. Accordingly, in the following description, the structure of periphery of the lighting unit will be described in detail and the description of common parts will be omitted. In each drawing used in the description, the same reference numerals are used for constituent elements which are common with in FIG. 13 and FIG. 14.

Figure 17:
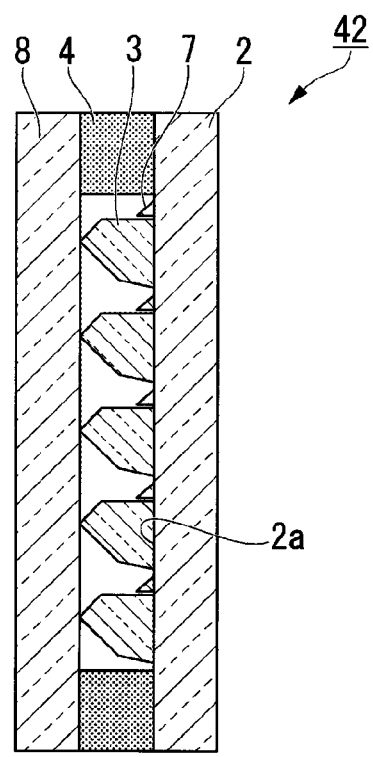
FIG. 17 is a diagram showing an overall configuration of a lighting film of a fifth embodiment.

FIG. 17 is a diagram showing an overall configuration of the lighting film 42 of the fifth embodiment.

Figure 18:
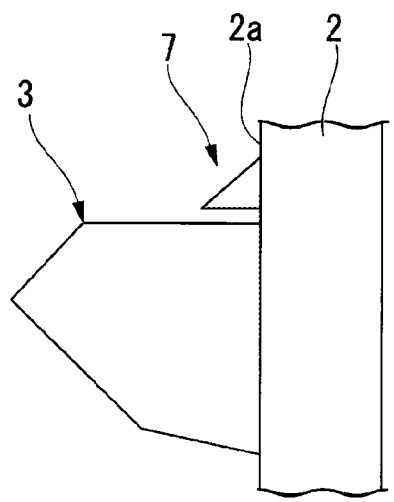
FIG. 18 is a sectional view showing a structure of periphery of a lighting unit of the fifth embodiment.

FIG. 18 is a sectional view showing a structure of periphery of the lighting unit of the fifth embodiment. As shown in FIG. 17 and FIG. 18, the lighting film 42 of this embodiment includes the plurality of lighting units 3 and the plurality of auxiliary lighting units 7 on the first surface 2a of the first substrate 2, and one auxiliary lighting unit 7 is provided between the two adjacent lighting units 3 to be separated therefrom.

As described above, the auxiliary lighting unit 7 may be disposed to be separated from the adjacent lighting unit 3. In this case, since a gap formed between the lighting unit 3 and the auxiliary lighting unit 7 is significantly small, light directly leaking from the gap and becoming glare light is substantially not observed.

Accordingly, in the same manner as the embodiment described above, light not incident to the lighting unit 3 due to the low altitude is incident to the auxiliary lighting unit 7, refracted obliquely downwards, and output to the floor 1002 side of the room 1006 shown in FIG. 4. Therefore, it is also possible to prevent generation of glare light in the lighting film 42 of this embodiment.

[Sixth Embodiment]

Next, a lighting film 44 of a sixth embodiment of the invention will be described.

A basic configuration of the lighting film 44 of this embodiment shown below is approximately the same as that of the first embodiment, but a structure of periphery of a lighting unit is different therefrom. Accordingly, in the following description, the structure of periphery of the lighting unit will be described in detail and the description of common parts will be omitted. In each drawing used in the description, the same reference numerals are used for constituent elements which are common with those in FIG. 1.

Figure 19:
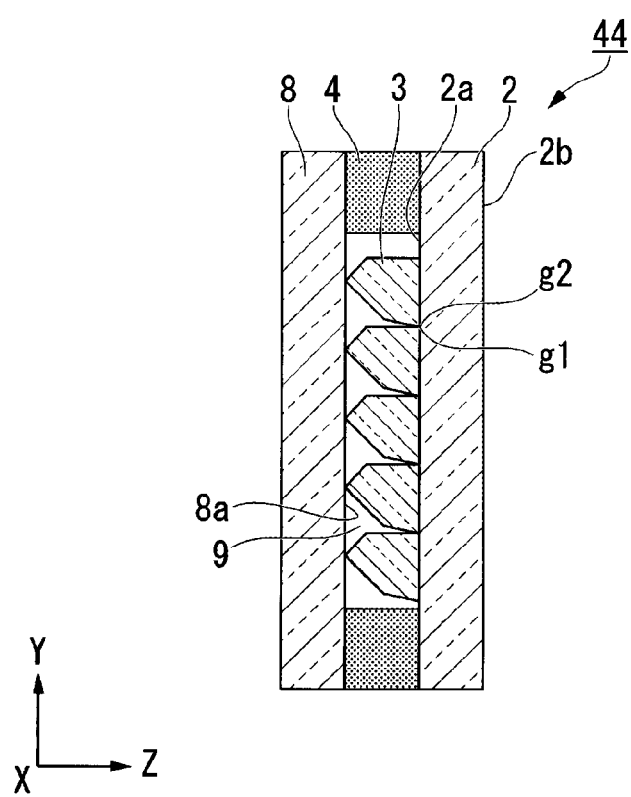
FIG. 19 is a diagram showing an overall configuration of a lighting film of a sixth embodiment.

FIG. 19 is a diagram showing an overall configuration of the lighting film 44 of the sixth embodiment.

As shown in FIG. 19, in the lighting film 44 of this embodiment, the adjacent lighting units 3 are disposed to be close to each other and ends of each lighting unit 3 (the first vertex q1 of one adjacent lighting unit 3 and the second vertex q2 of the other lighting unit 3 as shown in FIG. 2) are contacted with each other.

Figure 20:
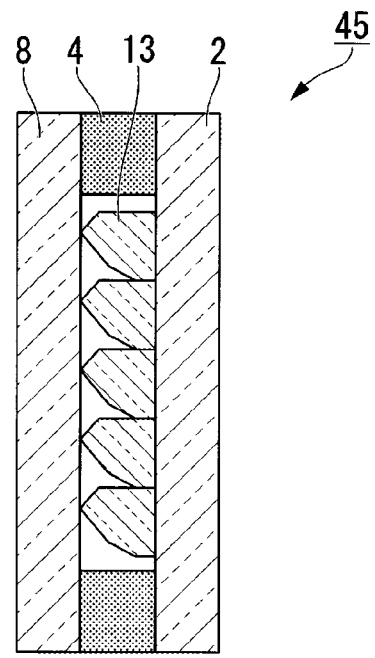
FIG. 20 is a diagram showing another configuration example of the lighting film of the second embodiment.
Figure 21:
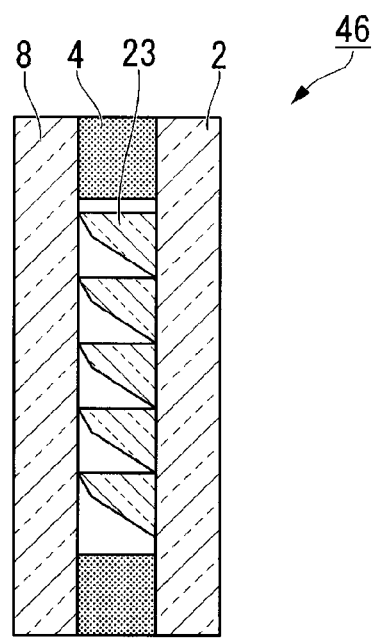
FIG. 21 is a diagram showing another configuration example of the lighting film of the third embodiment.

As other configuration examples of the lighting film of the second embodiment and the third embodiment described above, lighting films 45 and 46 having configurations in which the adjacent lighting units 13 or the adjacent lighting units 23 are disposed to be close to each other may be used, as shown in FIG. 20 and FIG. 21.

In each embodiment described above, the lighting films 1, 12, 22, 32, 42, and 44 are bonded to the surface of the interior side of the window glass 8, but the lighting films 1, 12, 22, 32, 42, and 44 may be bonded to the surface on the exterior side (outdoor side) of the window glass 8. In both cases, the bonding may be performed in a state where the first substrate 2 faces the interior side. In addition, the lighting films 1, 12, 22, 32, 42, and 44 may be installed between two glass pieces as a double window.

The configuration of the window glass 8 according to each embodiment described above is not limited to a case of being installed in a fixed type window frame, and may have a configuration of being installed in an opening and closing type window frame, for example. The window glass may be installed in a window frame of a rotation type of being rotated in a vertical direction and a rotation type of being rotated in a horizontal direction, or may be installed in a window frame of a slide type of being slid in a vertical direction and a horizontal direction.

[Seventh Embodiment]
(Rolling Screen)

Next, a rolling screen (lighting device) 301 shown in FIG. 22 and FIG. 23 will be described as a seventh embodiment of the invention, for example.

Figure 22:
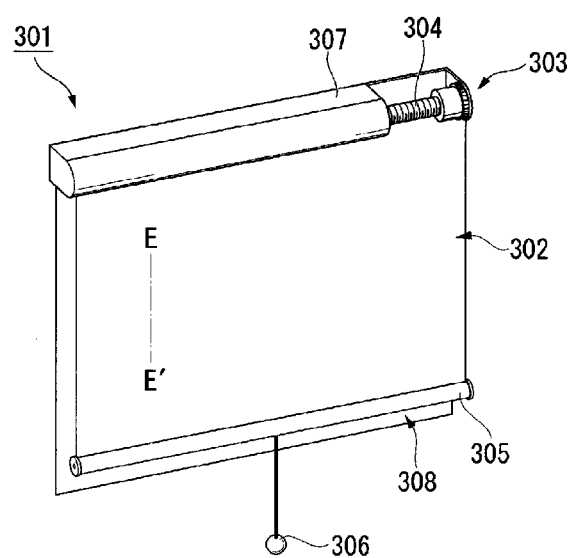
FIG. 22 is a perspective view showing a schematic configuration of a rolling screen.

FIG. 22 is a perspective view showing a schematic configuration of the rolling screen 301. FIG. 23 is a sectional view taken along line E-E' of the rolling screen 301 shown in FIG. 22. In the following description, the description of the parts equivalent to those of the lighting film will be omitted and the same reference numerals are used in the drawings.

Figure 23:
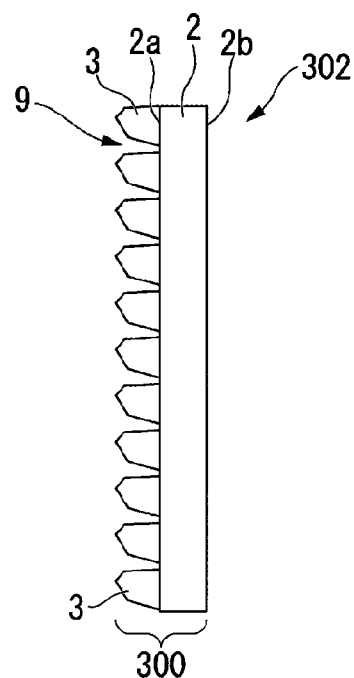
FIG. 23 is a sectional view taken along line E-E' of the rolling screen shown in FIG. 22.

As shown in FIG. 22 and FIG. 23, the rolling screen 301 includes a lighting screen 302 and a winding mechanism 303 which supports the lighting screen 302 to be freely wound up.

As shown in FIG. 22, the lighting screen 302 includes a lighting member 300 including the film-shaped (sheet-shaped) first substrate 2 having optical transparency, the plurality of lighting units 3 formed to be arranged on the first surface 2a of the first substrate 2, and the plurality of gaps 9 each of which is formed between the plurality of lighting units 3, and takes external light into a room through the lighting member 300. The lighting screen 302 has basically the same structure as that of the lighting film 1. However, a thickness of the first substrate 2 is a thickness suitable for the rolling screen 301.

As shown in FIG. 22, the winding mechanism 303 includes a core (support member) 304 attached along an upper end portion of the lighting screen 302, a bottom tube (support member) 305 attached along a lower end portion of the lighting screen 302, a pulling cord 306 attached to the center of the lower end portion of the lighting screen 302, and an accommodation case 307 which accommodates the lighting screen 302 wound around the core 304.

The winding mechanism 303, as a pull-cord type, may fix the lighting screen 302 at a pulled position, or may automatically wind the lighting screen 302 around the core 304 by releasing the fixation by further pulling the pulling cord 306 from the pulled position. The winding mechanism 303 is not limited to such a pull-cord type, and may be a chain-type winding mechanism which rotates the core 304 with a chain or an automatic winding mechanism which rotates the core 304 with a motor.

The rolling screen 301 having such a configuration is used in a state where the accommodation case 307 is fixed to the upper portion of the window glass 308 and the lighting screen 302 accommodated in the accommodation case 307 opposes the inner surface of the window glass 308 while pulling the lighting screen with the pulling cord 306. At this time, the lighting screen 302 is disposed in a direction in which the arrangement direction of the plurality of lighting units 3 with respect to the window glass 308 coincides with the longitudinal direction (vertical direction) of the window glass 308. That is, the lighting screen 302 is disposed so that the longitudinal direction of the plurality of lighting units 3 with respect to the window glass 308 coincides with the transverse direction (horizontal direction) of the window glass 308.

The lighting screen 302 opposing the inner surface of the window glass 308 directs light incident to a room through the window glass 308 towards the ceiling in the room, while changing a travelling direction of light with the plurality of lighting units 3. The light travelling to the ceiling is reflected by the ceiling and illuminates the room, and thus, the light is used as illumination light. Therefore, in a case where such a rolling screen 301 is used, it is possible to expect an energy saving effect of saving energy consumed by illumination equipment in a building in the daytime.

As described above, in a case where the rolling screen 301 of this embodiment is used, it is possible to efficiently take outdoor natural light (sunlight) into a room, cause a person in the room feel that the inner area of the room is bright, without being dazzled, and prevent fluctuation of an illumination position accompanied with the altitude change of the sun.

Although not shown, as the rolling screen according to this embodiment of the invention, in addition to the configuration of the rolling screen 301, a functional film such as a light diffusion film for diffusing light in a direction facing the glare area G or a heat insulation film having optical transparency for insulating radiant heat of natural light (sunlight) may be disposed on the second surface 2b side of the first substrate 2, for example.

[Eighth Embodiment]
(Blind)

Next, a blind (lighting device) 401 shown in FIG. 24 will be described as an eighth embodiment of the invention, for example.

Figure 24:
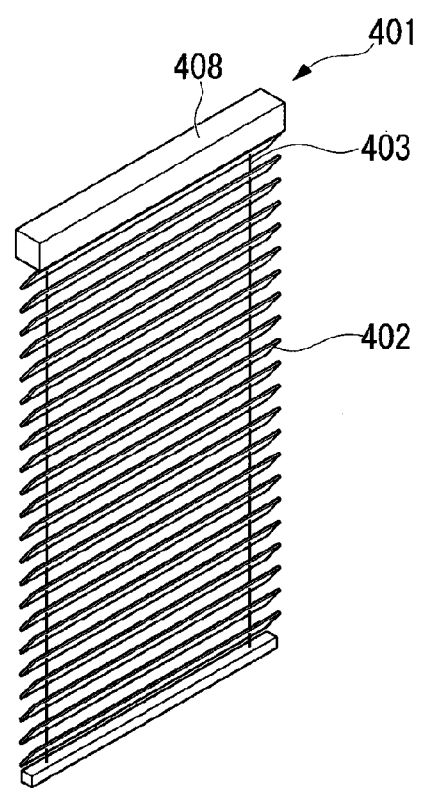
FIG. 24 is a perspective view showing a schematic configuration of a blind.
Figure 25A:
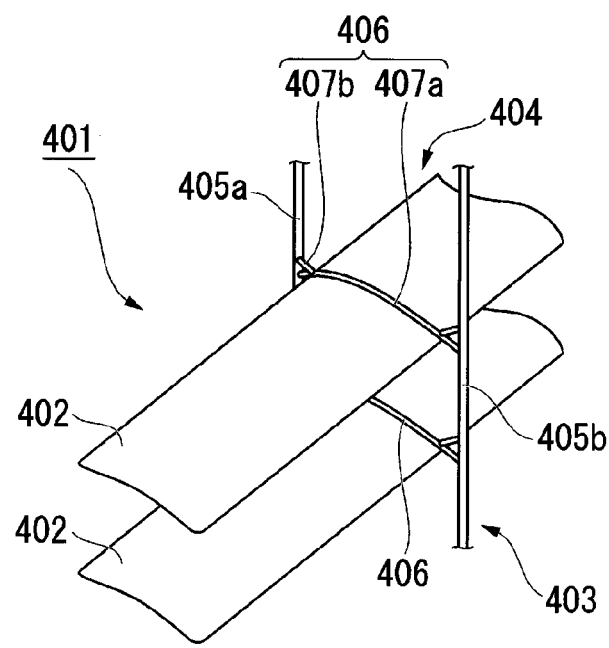
FIG. 25A is a first perspective view showing a schematic configuration of the blind.
Figure 25B:
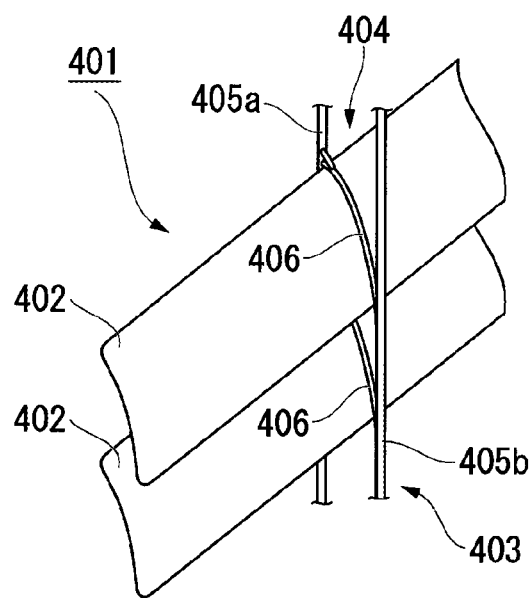
FIG. 25B is a second perspective view showing a schematic configuration of the blind.

FIG. 24 is a perspective view showing a schematic configuration of a blind. FIGS. 25A and 25B are perspective views showing a schematic configuration of a blind 401. FIG. 25A shows a opened state of the blind 401 and FIG. 25B shows a closed state of the blind 401.

In the following description, the description of the same part as in the lighting film 1 will be omitted and the same reference numerals are used in the drawings.

As shown in FIG. 24, the blind 401 includes a plurality of lighting slats 402 which are disposed at predetermined intervals, a tilting mechanism (support mechanism) 403 which supports the plurality of lighting slats 402 to be freely tilted, and an accommodation mechanism 408 which folds and accommodates the plurality of lighting slats 402 linked with the tilting mechanism (support mechanism) 403 so as to be input and output.

Figure 26:
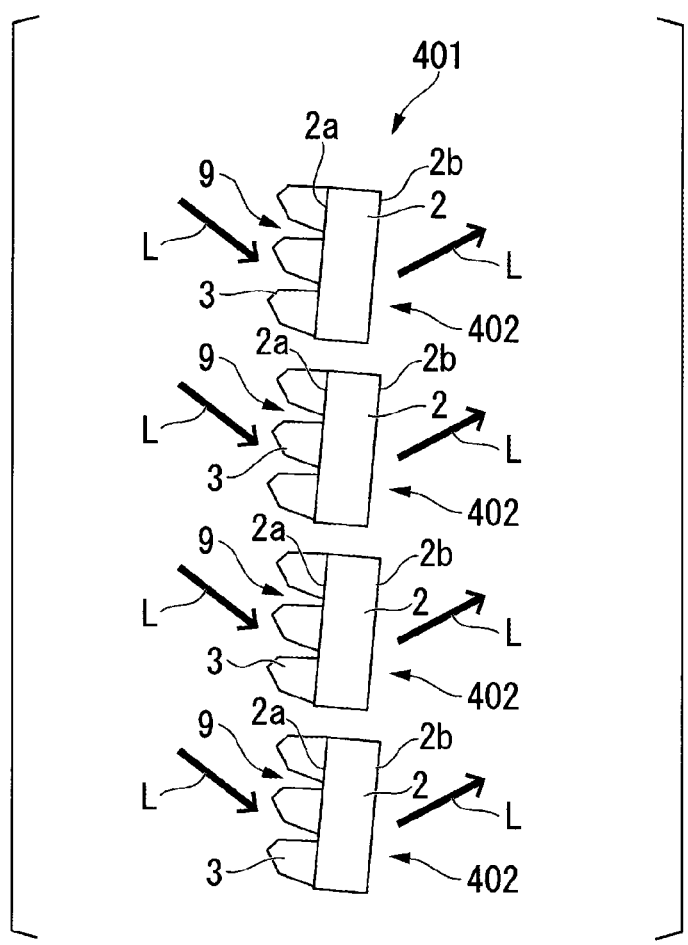
FIG. 26 is a sectional view showing a schematic configuration of lighting slats included in the blind.

As shown in FIGS. 25A, 25B, and 26, each of the plurality of lighting slats 402 is a lighting member including the elongated plate-shaped first substrate 2 having optical transparency, the plurality of lighting units 3 formed to be arranged on the first surface 2a of the first substrate 2, and the plurality of gaps 9 each of which is formed between the plurality of lighting units 3. Each lighting slat 402 has basically the same structure as that of the lighting film 1. However, the shape of the first substrate 2 is different from that of the lighting film or the lighting screen of each embodiment described above.

The tilting mechanism 403 includes a plurality of ladder cords 404. Although not shown, the plurality of ladder cords 404 are arranged in a longitudinal direction of the lighting slats 402 to support the plurality of lighting slats 402. Specifically, the ladder cords 404 include a pair of vertical cords 405a and 405b arranged in parallel to each other, and a plurality of horizontal cords 406 each of which is stretched between the vertical cords 405a and 405b and which are arranged at equivalent intervals in the longitudinal direction of the vertical cords 405a and 405b. In the ladder cord 404, the lighting slat 402 is interposed with a pair of holding cords 407a and 407b configuring the horizontal cord 406 and the lighting slat 402 is held between the vertical cords 405a and 405b.

Although not shown, the tilting mechanism 403 includes an operation mechanism of moving the pair of vertical cords 405a and 405b in the vertical direction in the reverse direction to each other. In the tilting mechanism 403, it is possible to tilt the plurality of lighting slats 402 while synchronizing the lighting slats with each other, with the movement operation of the pair of vertical cords 405a and 405b performed by the operation mechanism described above.

The blind 401 having the configuration described above is used in a state of being suspended from an upper portion of a window glass (not shown) and opposing the inner surface of the window glass. At that time, each lighting slat 402 is disposed in a direction in which the arrangement direction of the plurality of lighting units 3 with respect to the window glass coincides with the longitudinal direction (vertical direction) of the window glass. That is, the lighting slat 402 is disposed so that the longitudinal direction of the plurality of lighting units 3 with respect to the window glass coincides with the transverse direction (horizontal direction) of the window glass.

As shown in FIG. 26, the blind 401 opposing the inner surface of the window glass directs light L incident to a room through the window glass towards the ceiling in the room, while changing a travelling direction of light with the plurality of lighting units 3. The light travelling to the ceiling is reflected by the ceiling and illuminates the room, and thus, the light is used as illumination light. Therefore, in a case where such a blind 401 is used, it is possible to expect an energy saving effect of saving energy consumed by illumination equipment in a building in the daytime.

In the blind 401, it is possible to adjust the angle of light L travelling to the ceiling by tilting the plurality of lighting slats 402. In addition, it is possible to adjust light incident between the plurality of lighting slats 402.

Figure 27:
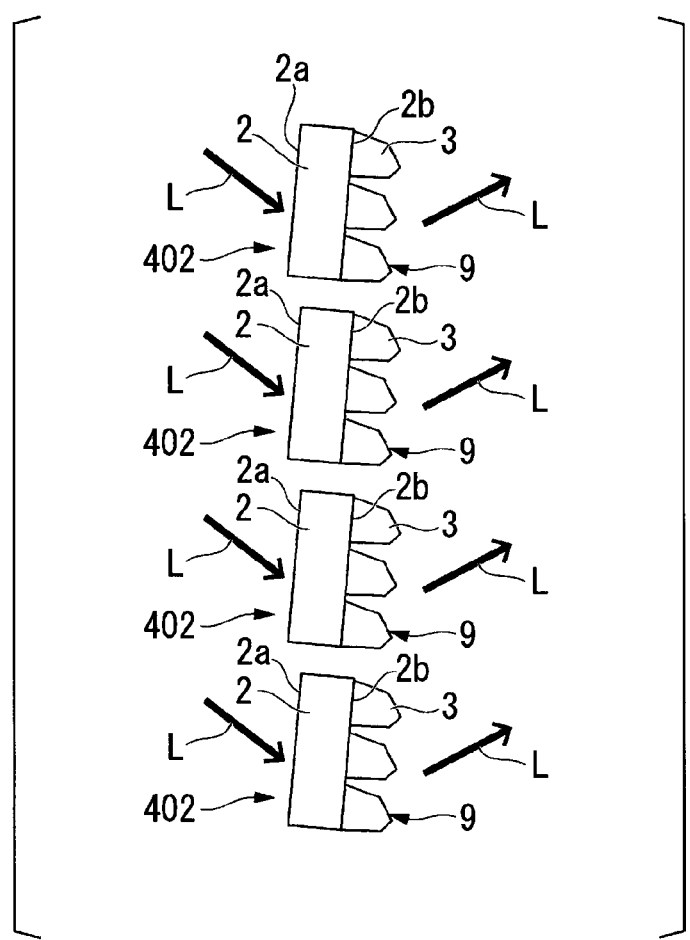
FIG. 27 is a sectional view showing a state where directions of the lighting slats included in the blind are reversed.

As shown in FIG. 27, in the blind 401, even in a case where the direction of the lighting slats 402 is inverted by 180°, it is possible to illuminate the ceiling in the room with the light L incident to a room through the window glass, while changing a travelling direction of light with the plurality of lighting units 3, in the same manner as the case before inverting the direction of the lighting slats 402.

Figure 28:
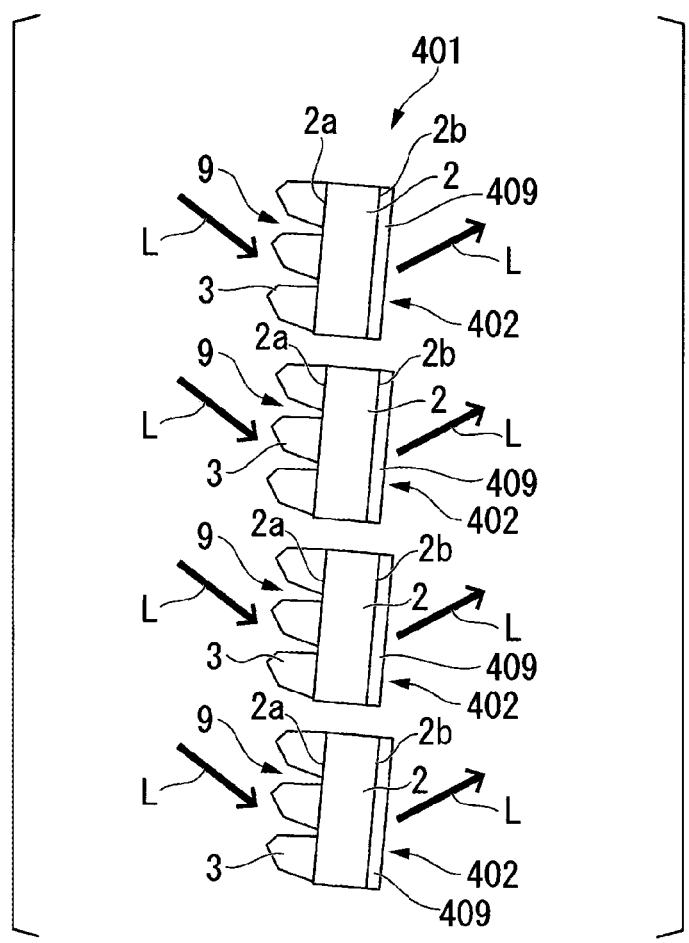
FIG. 28 is a sectional view showing a modification example of the lighting slats.

As shown in FIG. 28, an elongated plate-shaped slat member 409 may be separately provided on the second surface 2b side of the elongated plate-shaped first substrate 2. In this case, refractive indexes of the first substrate 2 and the slat member 409 are desirably approximately equivalent to each other.

As described above, in a case where the blind 401 of this embodiment is used, it is possible to efficiently take outdoor natural light (sunlight) into a room, cause a person in the room feel that the inner area of the room is bright, without being dazzled, and prevent fluctuation of an illumination position accompanied with the altitude change of the sun.

The invention is not limited to the configuration of the blind 401 of the eighth embodiment and various modifications may be performed within a range not departing from the gist of the invention.

For example, although not shown, as the blind according to this embodiment of the invention, in addition to the configuration of the blind 401, a functional film (functional member) such as a light diffusion film (light diffusion member) for diffusing light in a direction facing the glare area G or a heat insulation film (heat insulation member) having optical transparency for insulating radiant heat of natural light (sunlight) may be disposed on the second surface 2b side of the first substrate 2, for example.

In addition, as the blind according to the embodiment of the invention, a combination of the lighting slat 402 and a lighting slat having light shielding properties may be used. In this case, the blind includes a lighting unit configured with the plurality of lighting slats 402, and a light shielding unit which is positioned on the lower portion of the lighting unit and configured with a plurality of light shielding slats. With this configuration, it is possible to illuminate the ceiling in the room with light incident to a room through the window glass by using the plurality of lighting slats 402 configuring the lighting unit and shield light travelling to the glare area by using the plurality of light shielding slats configuring the light shielding unit.

[Illumination Modulating System]

Figure 29:
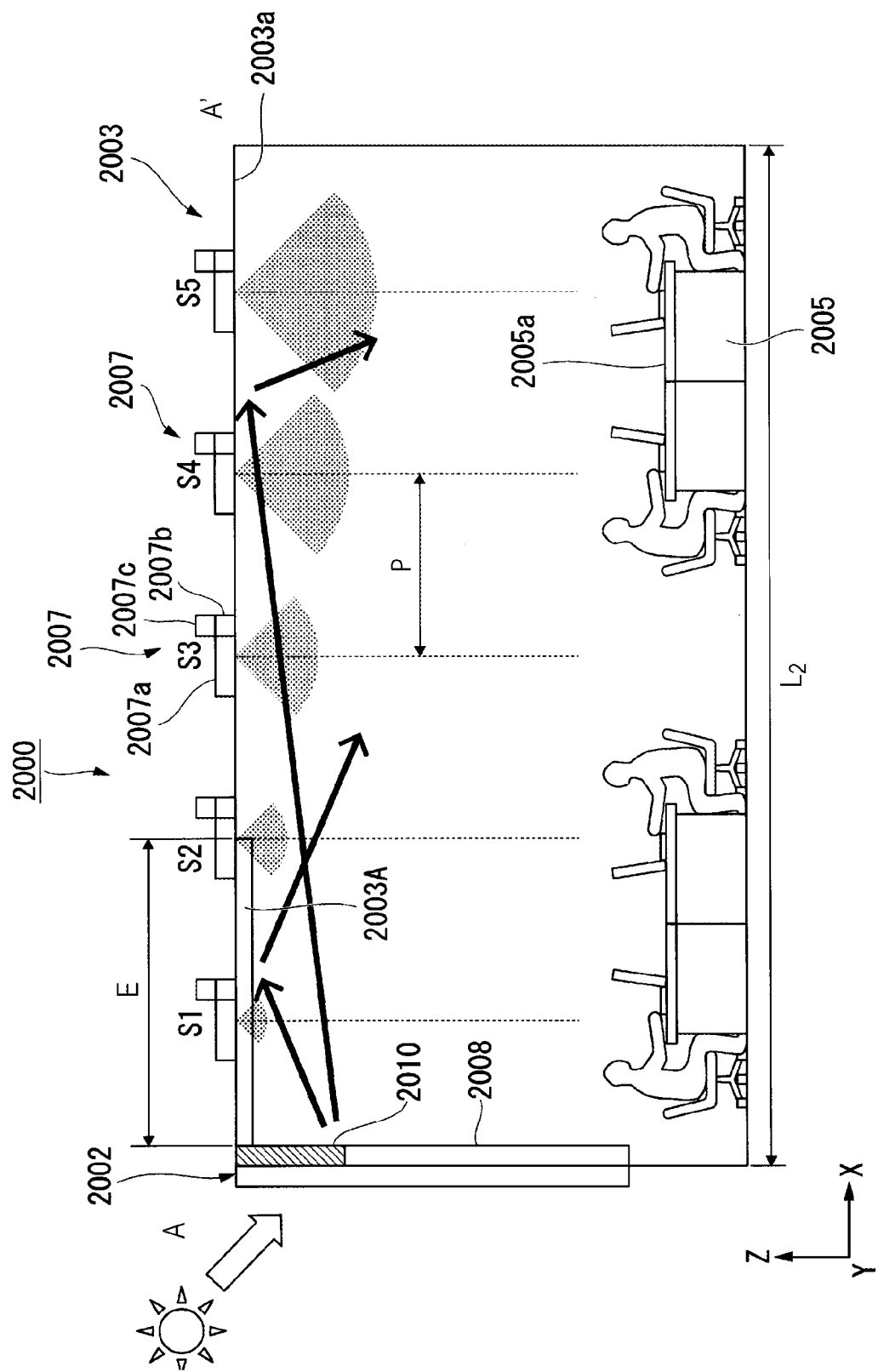
FIG. 29 is a diagram showing a room model 2000 including a lighting device and illumination modulating system.

FIG. 29 is a diagram showing a room model 2000 including a lighting device and illumination modulating system.

Figure 30:
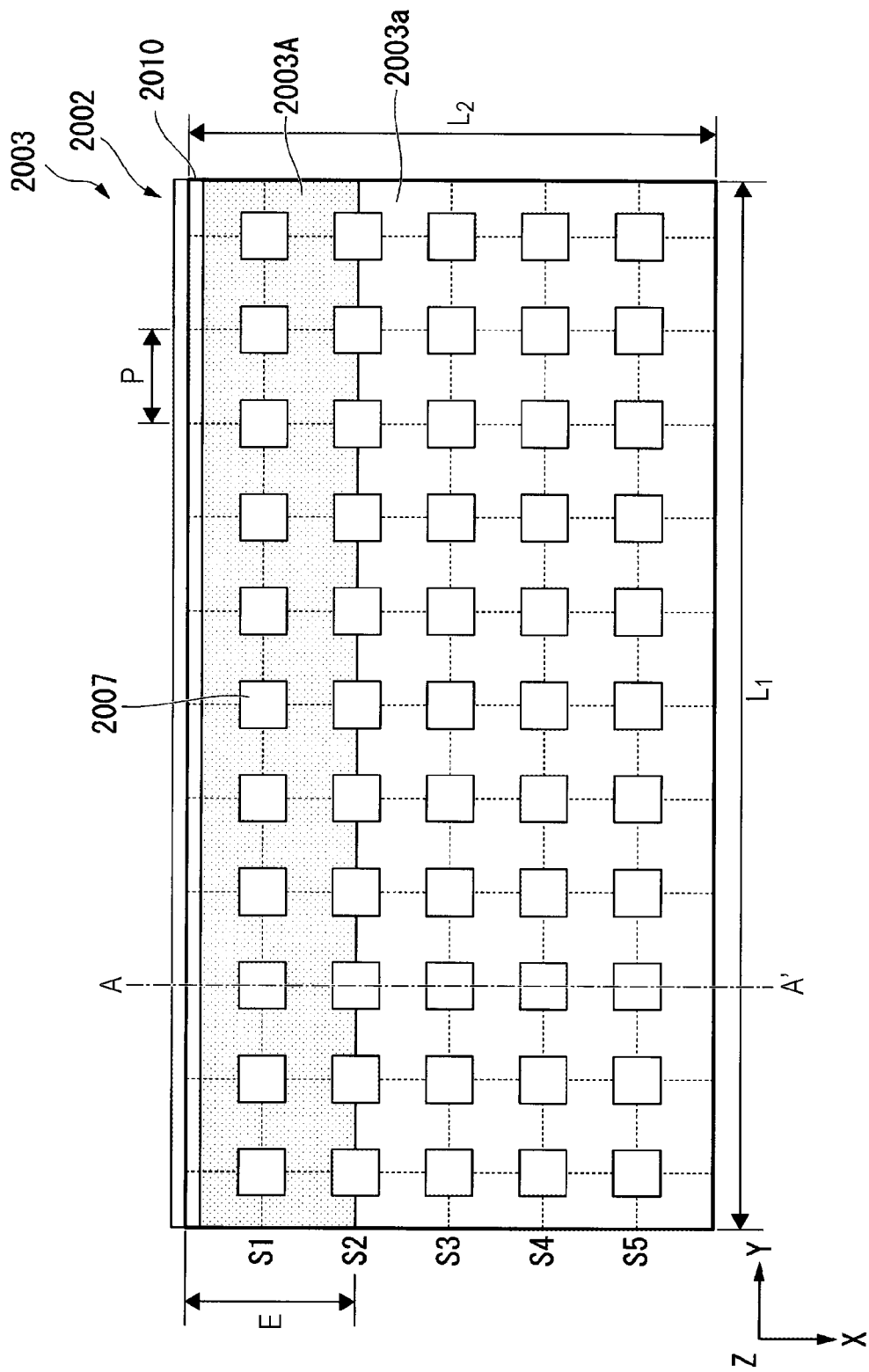
FIG. 30 is a plan view showing a ceiling of the room model 2000.

FIG. 30 is a plan view showing a ceiling of the room model 2000.

In the invention, a ceiling material configuring a ceiling 2003a of a room 2003 to which external light is introduced may have high light reflection. As shown in FIG. 29 and FIG. 30, a light reflective ceiling material 2003A is installed on the ceiling 2003a of the room 2003 as a ceiling material having light reflection. The light reflective ceiling material 2003A is for promoting the introduction of external light from a lighting device 2010 installed in a window 2002 into a rear side of the room, and therefore, the ceiling material is installed on a ceiling 2003a at the window side. Specifically, the ceiling material is installed in a predetermined area E of the ceiling 2003a (area within approximately 3 m from the window 2002).

As described above, the light reflective ceiling material 2003A functions to efficiently introduce external light introduced into the room through the window 2002 where the lighting device 2010 of the invention (lighting device of any embodiment described above) is installed, into a rear side of the room. The external light introduced to the ceiling 2003a in the room from the lighting device 2010 is reflected by the light reflective ceiling material 2003A to change the direction and illuminates a desk upper surface 2005a of a desk 2005 which is disposed on the rear side of the room, and accordingly, an effect of making the desk upper surface 2005a light is exhibited.

The light reflective ceiling material 2003A may have diffuse reflection or specular reflection, and preferably has both properties suitably combined with each other, in order to satisfy both an effect of making the desk upper surface 2005a of the desk 2005 placed on the rear side of the room light, and an effect of preventing glare light which is uncomfortable for a person in the room.

Most of light introduced into the room by the lighting device 2010 of the invention travels to the ceiling close to the window 2002, and the quantity of light in the vicinity of the window 2002 is sufficient, in many cases. Therefore, by using the light reflective ceiling material 2003A described above together, the light incident to the ceiling (area E) close to the window can be shared to the rear side of the room where the quantity of light is smaller than that at the window side.

The light reflective ceiling material 2003A may be manufactured by performing an embossing process on a metal plate such as aluminum with ruggedness of approximately several tens microns, or performing vapor deposition of a metal thin film such as aluminum on a resin substrate having the same ruggedness thereon. Alternatively, the light reflective ceiling material may be formed on a curved surface on which the ruggedness is formed in a greater period by the embossing process.

By suitably changing the embossed state formed on the light reflective ceiling material 2003A, it is possible to control distribution properties of light or distribution of light into the room. For example, in a case where the embossing process is performed to have a stripe shape extending to the rear side of the room, light reflected by the light reflective ceiling material 2003A expands in a horizontal direction of the window 2002 (direction orthogonal to a longitudinal direction of ruggedness). In a case where the size or direction of the window 2002 of the room 2003 is limited, the light may be diffused in the horizontal direction by the light reflective ceiling material 2003A and reflected towards the rear direction of the room, by using the properties described above.

The lighting device 2010 of the invention is used as a part of the illumination modulating system of the room 2003. The illumination modulating system is configured with constituent members of the entire room including the lighting device 2010, a plurality of interior illumination devices 2007, a solar control device 2008 installed on the window, a control system 2009 thereof, and the light reflective ceiling material 2003A installed on the ceiling 2003a.

The lighting device 2010 is installed on the upper side of the window 2002 of the room 2003 and the solar control device 2008 is installed on the lower side thereof. Here, a blind is installed as the solar control device 2008, but there is no limitation.

In the room 2003, the plurality of interior illumination devices 2007 are disposed in a lattice shape in a horizontal direction (Y direction) of the window 2002 and a depth direction (X direction) of the room. The plurality of interior illumination devices 2007 configures the illumination system of the entire room 2003 together with the lighting device 2010.

As shown in FIG. 29 and FIG. 30, the ceiling 2003a of an office in which a length L1 of the window 2002 in the horizontal direction (Y direction) is 18 m and a length L2 of the room 2003 in depth direction (X direction) is 9 m is shown, for example. Here, the interior illumination devices 2007 are arranged in a lattice shape in the horizontal direction (Y direction) and the depth direction (X direction) of the ceiling 2003a at intervals P of 1.8 m, respectively. More specifically, 50 interior illumination devices 2007 are arranged to have 10 columns (Y direction) and 5 rows (X direction).

The interior illumination device 2007 includes an interior illumination tool 2007a, a brightness detection unit 2007b, and a control unit 2007c, and the brightness detection unit 2007b and the control unit 2007c are configured integrally with the interior illumination tool 2007a.

The interior illumination device 2007 may include the plurality of interior illumination tools 2007a and brightness detection units 2007b, respectively. However, one brightness detection unit 2007b is provided for each interior illumination tools 2007a. The brightness detection unit 2007b receives reflected light of a surface to be illuminated which is illuminated by the interior illumination tools 2007a, to detect illumination of the surface to be illuminated. Here, illumination of the desk upper surface 2005a of the desk 2005 which is placed in the room is detected by the brightness detection unit 200b.

The control units 2007c which are provided in the interior illumination devices 2007 one by one are connected to each other. The interior illumination devices 2007 performs feedback control of adjusting light output of an LED lamp of each interior illumination tool 2007a by using the control units 2007c connected to each other, so that the illumination of the desk upper surface 2005a detected by each brightness detection unit 2007b becomes a target illumination L0 (for example, average illumination: 750 lx).

FIG. 31 is a graph showing a relationship between illumination of light (natural light) taken into a room by the lighting device and illumination (illumination modulating system) obtained by an interior lighting device.

As shown in FIG. 31, the illumination of the desk upper surface by (the lighting of the natural light of) the lighting device 2010 decreases, as it goes far from the window. Meanwhile, in a case where the interior illumination devices 2007 (illumination modulating system) are installed in the ceiling of the room without installing the lighting device 2010 on the window, the illumination of the desk upper surface increases, as it goes far from the window. It is found that, in a case where the lighting device 2010 and the interior illumination devices 2007 (illumination modulating system) are used together, the illumination of the desk upper surface in the room generally increases, compared to a case where any one of the lighting device 2010 and the interior illumination devices 2007 (illumination modulating system) is used. The window side is most bright due to the effect of the lighting device 2010 and a slight decrease in brightness is observed as it goes far from the window, but approximately a constant illumination (average illumination: 750 lx) is obtained.

As described above, by using the lighting device 2010 and the interior illumination devices 2007 (illumination modulating system) together, it is possible to send light to the rear side of a room and to further improve brightness of the room. Accordingly, a bright light environment which is further stabled is obtained, without being affected by the altitude of the sun.

Hereinabove, the preferred embodiments according to the invention have been described with reference to the accompanied drawings, but the invention is not limited to such examples. It is clear for a person skilled in the art that various modification examples or correction examples can be proposed within a range of a technical ideas disclosed in the claims, and the examples are in the technical ideas disclosed in the claims.

INDUSTRIAL APPLICABILITY

An aspect of the invention can be applied to a lighting member, a lighting device, and a method for installing a lighting member in which it is necessary to further prevent glare.

REFERENCE SIGNS LIST 1, 12, 22, 32, 42, 44 LIGHTING FILM (LIGHTING MEMBER)
2 FIRST SUBSTRATE
2a FIRST SURFACE
2b SECOND SURFACE
3, 13, 23 LIGHTING UNIT (POLYGONAL PRISM-SHAPED STRUCTURE)
3A, 7A FIRST SIDE
3B, 7B SECOND SIDE
3C, 7C THIRD SIDE (SECOND SIDE)

3D FOURTH SIDE (THIRD SIDE)
7 AUXILIARY LIGHTING UNIT
8 WINDOW GLASS (TRANSPARENT STRUCTURE)
9 GAP
L, L1, L2 LIGHT
L, $L_1$, $L_2$ LENGTH
q1 FIRST VERTEX
q2 SECOND VERTEX
q3 THIRD VERTEX
q4 FOURTH VERTEX
q5 FIFTH VERTEX
q6 SIXTH Vertex
300 LIGHTING MEMBER
301 ROLLING SCREEN (LIGHTING DEVICE)
303 WINDING MECHANISM
304 CORE (SUPPORT MEMBER)
305 BOTTOM TUBE (SUPPORT MEMBER)
401 BLIND (LIGHTING DEVICE)
408 ACCOMMODATION MECHANISM

The invention claimed is:

1. A lighting member comprising:
a first substrate having optical transparency;
a plurality of lighting units formed of a plurality of polygonal prism-shaped structures having optical transparency provided on a first surface of the first substrate; and
gaps provided between the plurality of lighting units,
wherein the polygonal prism-shaped structure is a pentagon in a first sectional shape orthogonal to a first longitudinal direction of the polygonal prism-shaped structure, the pentagon having all of internal angles smaller than 180°,
the pentagon includes a first side which is one side of the pentagon corresponding to a second surface contacted with the first substrate, and first to fifth vertexes, the first vertex and the second vertex corresponding to both ends of the first side, the third vertex being not positioned on the first side,
a first length of a first perpendicular line of the first side passing the third vertex is longer than a second length of a second perpendicular line of the first side passing the fourth vertex,
a shape of the pentagon is asymmetrical with the first perpendicular line as a center,
the fourth vertex is positioned on one side of the first perpendicular line,
the fifth vertex is positioned on another side of the first perpendicular line,
the second length is longer than a third length of a third perpendicular line of the first side passing the fifth vertex, and
the first length is longer than a fourth length of the first side.

2. The lighting member according to claim 1,
wherein, a second side connects the third vertex and the fourth vertex,
a third side connects the third vertex and the fifth vertex, and
a first angle formed by the first perpendicular line and the second side is greater than a second angle formed by the first perpendicular line and the third side.

3. The lighting member according to claim 1,
wherein the third length of the perpendicular line of the first side passing the fifth vertex is longer than ½ of the first length.

4. The lighting member according to claim 1, the lighting member further comprising:
an auxiliary lighting unit formed of a polygonal prism-shaped structure having optical transparency between two of the plurality of lighting units, the two of the plurality of lighting units being adjacent to one another,
wherein the auxiliary lighting unit has a triangular shape in a second sectional shape orthogonal to a second longitudinal direction of the auxiliary lighting unit,
the pentagon has a first area and a second area, the first area being on one side of the first perpendicular line, the second area being on another side of the first perpendicular line, the first area being larger than the second area,
the triangular shape has a second side having a first tilt toward the first side,
a third side is included in the first area, contacts the fifth vertex, and has a second tilt, and
the first tilt is opposite to the second tilt.

5. A lighting device comprising:
the lighting member according to claim 1; and
a support member which supports the lighting member,
wherein the lighting device introduces external light through the lighting member.

6. The lighting device according to claim 5, the lighting device further comprising:
an accommodation mechanism which folds and accommodates the support member so as to be input and output.

7. The lighting device according to claim 5, the lighting device further comprising:
a winding mechanism of winding the support member so as to be input and output.

8. A lighting member comprising:
a first substrate having optical transparency;
a plurality of lighting units formed of a plurality of polygonal prism-shaped structures having optical transparency provided on a first surface of the first substrate; and
gaps provided between the plurality of lighting units,
wherein the polygonal prism-shaped structure is a hexagon in a sectional shape orthogonal to a longitudinal direction of the polygonal prism-shaped structure the hexagon having all of internal angles smaller than 180°,
the hexagon includes a first side which is one side of the hexagon corresponding to a second surface contacted with the first substrate, and first to sixth vertexes, the first vertex and the second vertex corresponding to both ends of the first side, the third vertex being not positioned on the first side,
a first length of a first perpendicular line of the first side passing the third vertex is longer than a second length of a second perpendicular line of the first side passing the fourth vertex,
a shape of the hexagon is asymmetrical with the first perpendicular line as a center,
the fourth vertex is positioned on one side of the first perpendicular line,
the fifth vertex is far from the first side among the fourth and fifth vertexes positioned on other side, and
the sixth vertex is close to the first side among the fourth and fifth vertexes,
the second length is longer than a third length of a third perpendicular line of a first side passing the fifth vertex.

9. The lighting member according to claim 8,
wherein a second side connects the third vertex and the fourth vertex
a third side connects the third vertex and the fifth vertex, and a first angle formed by the first perpendicular line and the second side is greater than a second angle formed by the first perpendicular line and the third side.

10. The lighting member according to claim 8, wherein the third length is longer than ½ of the first length.

11. A method for installing a lighting member, the method comprising:
- arranging a plurality of lighting units so that a side of a pentagon where a first area with respect to a first perpendicular line of a first side passing a third vertex is large faces a lower side in a vertical direction; and
- installing the lighting member in a transparent structure,
- wherein the lighting member includes,
  - a first substrate having optical transparency;
  - the plurality of lighting units formed of a plurality of polygonal prism-shaped structures having optical transparency provided on a first surface of the first substrate; and
  - gaps provided between the plurality of lighting units,
  - in which the polygonal prism-shaped structure is a pentagon in a sectional shape orthogonal to a longitudinal direction of the polygonal prism-shaped structure, the pentagon having all of internal angles smaller than 180°,
  - the pentagon includes the first side which is one side of the pentagon corresponding to a second surface contacted with the first substrate, and first to fifth vertexes, the first vertex and the second vertex corresponding to both ends of the first side, the third vertex being not positioned on the first side,
  - a first length of a first perpendicular line of the first side passing the third vertex is longer than a second length of a second perpendicular line of the first side passing the fourth vertex,
  - a shape of the pentagon is asymmetrical with the first perpendicular line as a center,
  - the fourth vertex is positioned on one side of the first perpendicular line,
  - the fifth vertex is positioned on another side of the first perpendicular line,
  - the second length is longer than a third length of a third perpendicular line of the first side passing the fifth vertex, and
  - the first length is longer than a fourth length of the first side,
  - a second side connects the third vertex and the fourth vertex,
  - a third side connects the third vertex and the fifth vertex, and
  - a first angle formed by the first perpendicular line and the second side is greater than a second angle formed by the first perpendicular line and the third side.

* * * * *